United States Patent
Jerdee et al.

(10) Patent No.: US 11,255,476 B2
(45) Date of Patent: Feb. 22, 2022

(54) INTERNALLY HEATED MODULAR FLUID DELIVERY SYSTEM

(71) Applicant: Wagner Spray Tech Corporation, Plymouth, MN (US)

(72) Inventors: Jeffrey S. Jerdee, Brooklyn Park, MN (US); Thomas P. Daigle, Hanover, MN (US); Shawn C. Johnson, Milaca, MN (US)

(73) Assignee: Wagner Spray Tech Corporation, Plymouth, MN (US)

(*) Notice: Subject to any disclaimer, the term of this patent is extended or adjusted under 35 U.S.C. 154(b) by 0 days.

(21) Appl. No.: 15/333,341

(22) Filed: Oct. 25, 2016

(65) Prior Publication Data

US 2017/0122475 A1 May 4, 2017

Related U.S. Application Data

(60) Provisional application No. 62/248,090, filed on Oct. 29, 2015.

(51) Int. Cl.
*B05B 9/00* (2006.01)
*F16L 53/30* (2018.01)
(Continued)

(52) U.S. Cl.
CPC ............ *F16L 53/30* (2018.01); *B05B 7/1693* (2013.01); *B05B 9/002* (2013.01); *B05C 9/14* (2013.01); *F16L 25/01* (2013.01); *F16L 53/38* (2018.01)

(58) Field of Classification Search
CPC . F16L 53/30; F16L 53/38; F16L 25/01; B05B 9/002; B05B 9/14
(Continued)

(56) References Cited

U.S. PATENT DOCUMENTS 3,418,676 A * 12/1968 Byczkowski ......... B60S 1/3415
15/250.04
3,716,886 A * 2/1973 Klomp .................... B60S 1/487
15/250.04
(Continued)

FOREIGN PATENT DOCUMENTS

CN 1918438 A 2/2007
CN 104797888 A 7/2015
(Continued)

OTHER PUBLICATIONS

Kromberg et al., English translation of DE29715336, 1997. (Year: 1997).*
(Continued)

*Primary Examiner* — Chee-Chong Lee
(74) *Attorney, Agent, or Firm* — Christopher J. Volkmann; Kelly, Holt & Christenson, PLLC

(57) ABSTRACT

A modular fluid delivery assembly is provided. The modular fluid delivery assembly comprises a fluid conduit. The modular fluid delivery assembly also comprises an electrical heating element disposed within the fluid conduit. The electrical heating element is configured to provide a heat source within the fluid conduit. The modular fluid delivery assembly also comprises a connection assembly, located proximate an end of the modular fluid delivery assembly, coupled to the heating element and the fluid conduit. The connection assembly is configured to provide a hydraulic coupling to the fluid conduit, and to provide an electronic coupling to the electrical heating element.

14 Claims, 17 Drawing Sheets

(51) Int. Cl.
  *F16L 25/01*  (2006.01)
  *F16L 53/38*  (2018.01)
  *B05B 7/16*  (2006.01)
  *B05C 9/14*  (2006.01)

(58) Field of Classification Search
  USPC .................................. 239/128; 392/478–482
  See application file for complete search history.

(56) References Cited

U.S. PATENT DOCUMENTS

| | | | | |
|---|---|---|---|---|
| 3,936,901 | A * | 2/1976 | Theckston | B60S 1/3805 |
| | | | | 15/250.04 |
| 5,065,471 | A * | 11/1991 | Laplante | B60S 1/3415 |
| | | | | 15/250.04 |
| 5,426,814 | A * | 6/1995 | Minnick | B60S 1/3805 |
| | | | | 15/250.04 |
| 5,488,752 | A * | 2/1996 | Randolph | B60S 1/3805 |
| | | | | 15/250.06 |
| 55,539,951 | | 9/1996 | Guell et al. | |
| 5,724,478 | A * | 3/1998 | Thweatt | F24H 1/142 |
| | | | | 219/535 |
| 6,330,395 | B1 | 12/2001 | Wu | |
| 2006/0108447 | A1 * | 5/2006 | Berger | B05B 15/658 |
| | | | | 239/284.1 |
| 2008/0317450 | A1 * | 12/2008 | Sawada | F24H 1/102 |
| | | | | 392/485 |
| 2009/0034949 | A1 | 2/2009 | Sawada et al. | |
| 2014/0209703 | A1 | 7/2014 | Jerdee et al. | |

FOREIGN PATENT DOCUMENTS

| | | | | |
|---|---|---|---|---|
| CN | 104937348 | A | 9/2015 | |
| DE | 29715336 | * | 11/1997 | ............... B60S 1/48 |
| DE | 112008003310 | T5 | 11/2010 | |
| EP | 1793152 | A1 | 6/2007 | |
| WO | WO 2005078355 | A1 | 8/2005 | |
| WO | WO 2014078381 | A1 | 5/2014 | |

OTHER PUBLICATIONS

International Search Report and Written Opinion for PCT/US2016/058996, dated Jan. 16, 2017, 15 pages.
Final Office Action for U.S. Appl. No. 15/897,402, dated Apr. 16, 2019, 21 pages.
Amendment for U.S. Appl. No. 15/897,402 dated Dec. 10, 2018, 32 pages.
Non-Final Office Action for U.S. Appl. No. 15/897,402 dated Sep. 28, 2018, 17 pages.
Extended European Search Report for European Patent Application No. 16860746.3 dated May 6, 2019, 8 pages.
First Office Action for Chinese Patent Application No. 201680063436.2. dated Mar. 21, 2019, 15 pages with English translation.
Second Office Action for Chinese Patent Application No. 201680063436.2 dated Sep. 23, 2019, 16 pages with English Translation.
Communication pursuant to Article 94(3) for European Patent Application No. 16860746.3 dated Apr. 7, 2020, 4 pages.
Third Office Action for Chinese Patent Application No. 201680063436.2 dated Mar. 5, 2020, 9 pages.
Communication pursuant to Article 94(3) for European Patent Application No. 16860746.3 dated Jan. 25, 2021, 5 pages.

\* cited by examiner

INTERNALLY HEATED MODULAR FLUID DELIVERY SYSTEM

CROSS-REFERENCE TO RELATED APPLICATIONS

The present application is based on and claims the benefit of U.S. Provisional Patent Application Ser. No. 62/248,090 filed Oct. 29, 2015, the content of which is hereby incorporated by reference in its entirety.

BACKGROUND

Fluid delivery hoses are used in a wide variety of applications to deliver fluid from a reservoir, tank or other receptacle to an apparatus or other suitable device for application to a surface. Examples of such fluid delivery devices include, without limitation, paint spraying systems, pressure washers, and plural component delivery systems. Often, the fluid is a liquid that must be delivered at a high pressure and/or high temperature in order to ensure sufficient atomization and consistent delivery for an application to a surface or space.

Many fluids are deliverable by a fluid delivery system with characteristics that are temperature dependent. Examples of temperature dependent characteristics of fluid that can affect their performance in a given process include viscosity and in the context of plural component delivery systems, the potential reactivity of a component. Accordingly, a number of fluid delivery systems employ thermal control systems in order to ensure proper thermal control of the fluid. In fact, in order to precisely control the temperature of a fluid all the way to an applicator, which may be a distance away from a pump, it is also know that fluid hoses themselves may be supplied with a source of heat. These heaters are typically electric heaters energized to initially heat the temperature of the fluid flowing through the hose.

SUMMARY

A modular fluid delivery assembly is provided. The modular fluid delivery assembly comprises a fluid conduit. The modular fluid delivery assembly also comprises an electrical heating element disposed within the fluid conduit. The electrical heating element is configured to provide a heat source within the fluid conduit. The modular fluid delivery assembly also comprises a connection assembly, located proximate an end of the modular fluid delivery assembly, coupled to the heating element and the fluid conduit. The connection assembly is configured to provide a hydraulic coupling to the fluid conduit, and to provide an electronic coupling to the electrical heating element.

DETAILED DESCRIPTION OF ILLUSTRATIVE EMBODIMENTS

Figure 1:
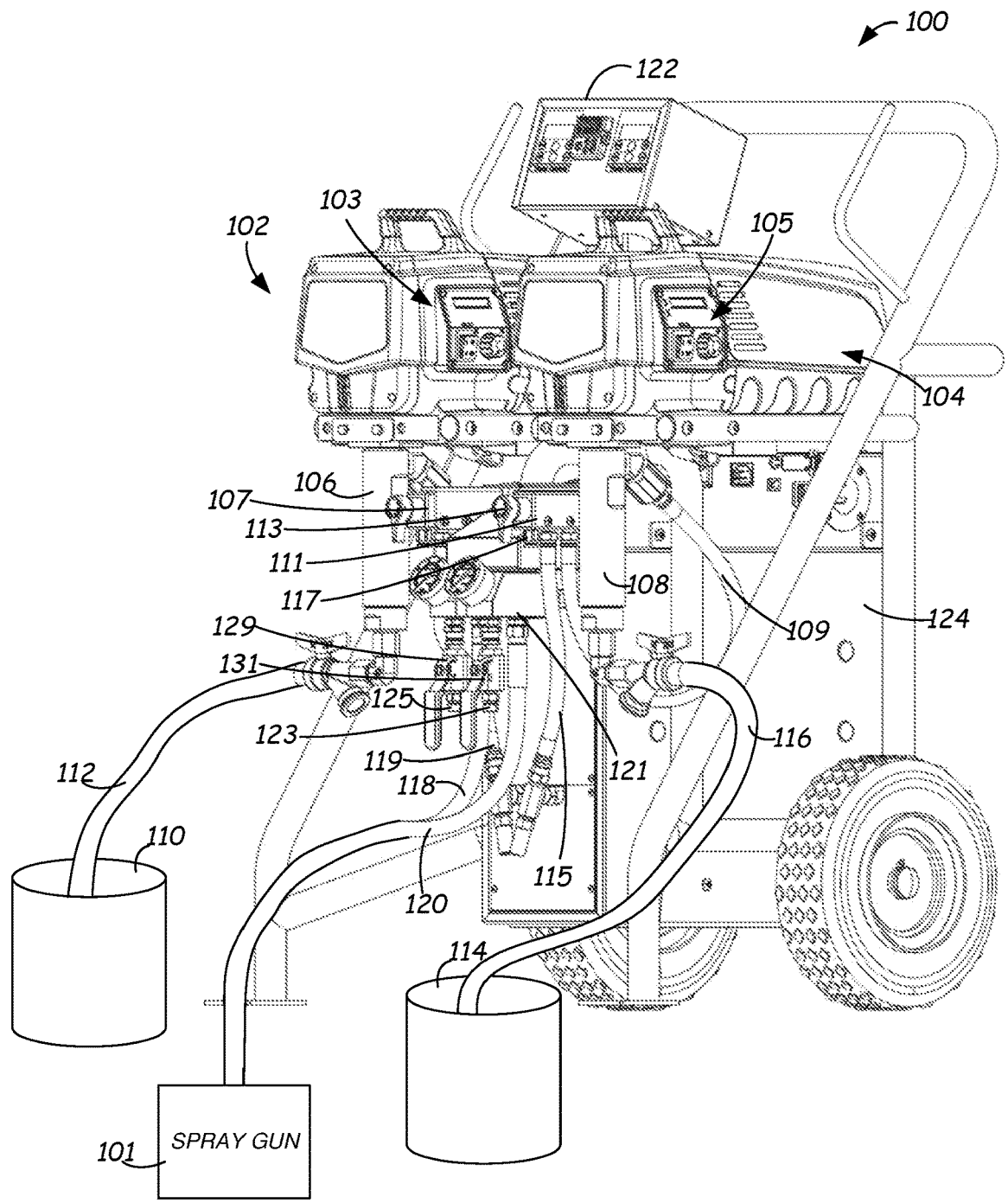
FIG. 1 illustrates one example of a fluid delivery system in which embodiments of the present invention are particularly useful.

Fluid delivery systems may require a fluid to be heated for delivery at an application source. Because many parameters of a fluid can be temperature dependent, it may be necessary for a fluid at an applicator source to have a consistent temperature during an application. For that reason, delivery fluid systems may comprise electrically heated fluid delivery hoses. There are currently two different kinds of electrically heated fluid delivery hoses.

Externally heated fluid delivery hoses generally have an electrical element that is positioned about an external surface of the fluid delivery hose and is configured to drive heat through a hose wall into the fluid. Given that the electrical element is disposed outside of the hose, it is also typically necessary for such externally heated hoses to have significant amounts of thermal insulation in order to help drive the majority of the heat into the fluid. However, there can still be significant thermal losses to an environment in such scenarios. Additionally, because of the thermal losses and the temperature limit of an electrical element, it may not be possible to use an electrical element external to the fluid to increase a temperature of a fluid within the hose, but only maintain a fluid temperature once initially heated.

Internally heated fluid delivery hoses are also known. Typically, internally heated fluid delivery hoses comprise an electrical heating element positioned within the fluid conduit itself. The internally positioned element is insulated from the fluid, for example by a non-conductive sleeve or coating, and when energized, directs substantially all of its heat into the fluid. While such internally positioned electrical elements are more efficient at transferring their heat to the fluid than external heaters, they provide additional challenges with respect to generating an effective seal for the heating element as it passes into the fluid conduit, which is some instances may sustain a fluid pressure of over 3,000 pounds per square inch (PSI).

Currently, internally heated fluid delivery hoses cannot be interconnected with additional externally, or internally, heated fluid delivery hoses. Therefore, if a user needs a longer internally heated hose than they currently have, a new hose with the desired length is currently required. Additionally, in the event that part of an internally-heated hose is damaged, the entire hose must be replaced, because of the difficulty in replacing or repairing the damaged portion.

Damage is most common at the applicator end, which tends to be used more roughly. Another issue exists for plural component systems, where, if crossfire occurs between two component streams (component A backfiring into component B delivery hose, for example), permanent damage can be sustained to a component streams, requiring the entire hose to be replaced.

Another problem present with internally heated hoses is they need to run a return wire from the applicator end back to a controller, often located at a pump end of the hose, to have a closed control loop. The 180° turn required at the applicator end of a hose can cause a kink, creating another potential source of failure. Additionally, running a wire within a hose, from the controller to the applicator and back, presents additional sources of failure that are difficult to repair. Accordingly, there is a need to provide a heated fluid delivery hose that provides the thermal efficiency of internal electrical heating, with the ability to interconnect multiple such hoses.

Embodiments described herein generally provide an internally heated modular fluid delivery hose module that is inter-connectable, both hydraulically and electrically, on either end, allowing for connections to additional hose modules while maintaining an effective seal to the heating element under relatively significant fluid pressures (rated up to 3,000 PSI, for example). Embodiments herein will generally be described with respect to a single heated wire or electrical element. However, additional heated wires or elements could be provided in other embodiments, for example in order to provide a higher wattage. Additionally, in some embodiments, a single heating element may comprise a plurality of wires, for example braided wires. Moreover, while embodiments herein are particularly applicable to fluid component delivery systems, it is expressly contemplated that at least some embodiments can be practiced with any fluid delivery system for which thermal control of the delivery fluid is desired. Further still, it is also contemplated that embodiments of the present invention can be used to retrofit a non-heated fluid delivery system with a heated fluid delivery system.

FIG. 1 illustrates one example of a fluid delivery system in which embodiments of the present invention are particularly useful. FIG. 1 illustrates a plural component fluid delivery system 100 configured to deliver two or more components that are combined, for instance using a dispensing component such as, but not limited to, a spray gun, an extruding gun, a plural component applicator, or other suitable mechanism. In one example, a spray gun (schematically represented in FIG. 1 by block 101) combines (for example, externally or internally in an internal mixing chamber) the two liquid components, which are then sprayed onto a surface, or into a space.

In one embodiment, system 100 includes a first pump unit 102, and a second pump unit 104, with each of pumps 102 and 104 configured to pump a respective component. Pump unit 102, in one embodiment, includes a first piston pump assembly 106, and pump unit 104 includes a second piston pump assembly 108. Piston pump assembly 106 receives a component from a first container 110, via tube or hose 112 in one embodiment. Piston pump assembly 108, in one embodiment, receives a second component, from a second container 114, via a tube or hose 116. Examples of containers 110 and 114 include, but are not limited to, 55 gallon barrels or other appropriate containers. The pressurized components, in one embodiment, are delivered to spray gun 101 or another suitable output device via hoses 118 and 120. It is noted that while two pump units are illustrated, in one embodiment, three or more pumps can be utilized to deliver a respected component at a desired ratio.

System 100 includes one or more controllers. In the illustrated embodiment, system 100 includes a heater controller 122 controller 122 configured to control operation of a heater assembly. Further, each pump unit 102 and 104 includes a controller 103 and 105 configured to control the respective pump units to deliver the components at a desired ratio and/or pressure. For example, the components can be sprayed at pressures up to, or exceeding, 3,200 PSI, and in ratios of 1:1, 1.25:1, 1.5:1, 1.75:1, 2:1, 5:1, or any other desired ratio. However, while embodiments herein are described with respect to high pressure applications, it is to be understood that systems described herein could also be used for lower pressure spraying applications. While multiple controllers are described herein, in one embodiment, a single controller can be provided for controlling operation of the pump units and heater assembly.

The pressurized fluid from each piston pump assembly 106 and 108, in one embodiment, is provided through a tube to a prime/spray valve. As illustrated in FIG. 1, a tube 109 provides a path from second piston pump assembly 108 to prime spray valve 111 having an actuation mechanism 113, such as a knob, to select between priming and spraying functions. In the spraying position, the fluid is directed through a tube 115 into housing 124. In a priming position, the fluid is directed from a port 117 through a return hose (not shown in FIG. 1) to container 114. Similar tubes and components are provided for assembly 106.

Housing 124 comprises an enclosure housing a heater assembly that receives the first and second liquid components via tubes 115 and 119 respectively. Tube 119 provides a path from prime/spray valve 107 associated with first piston pump assembly 106.

Heated liquid components exit housing 124, in one embodiment, into a secondary housing 121, which provides a sealed gateway for the electrical heating wires of heating elements. Housing 121 also provides an attachment of pressure gauges and recirculating valve assemblies 129 and 131 for each component, which are operable, in one embodiment, to selectively direct the liquid components to return paths to their respective containers. Illustratively, assembly 131 is operable to supply the first component to either hose 120, or through a recirculating hose attached to port 123. Assembly 129 is operable to supply the second component to either hose 118, or through a recirculating hose attached to port 125. In this manner, the recirculating valve assemblies 129 and 131 allow the components to be circulated through the heater assembly for preheating prior to spraying.

Figure 2:
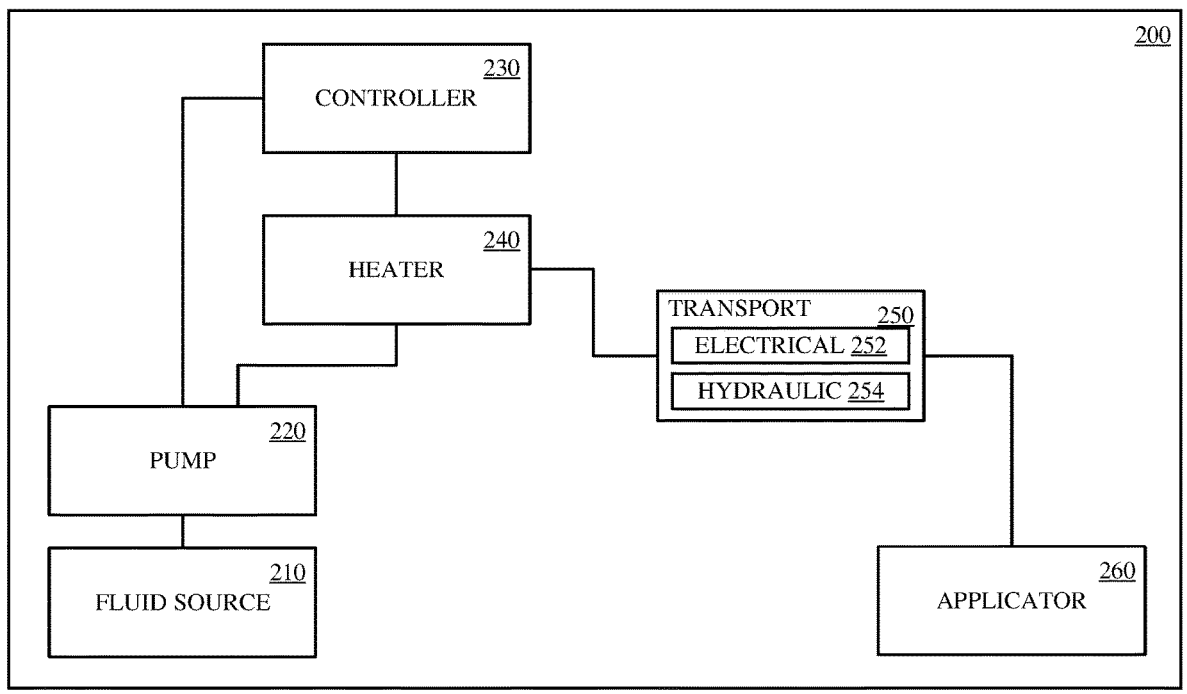
FIG. 2 is a diagrammatic view of a fluid delivery system in accordance with an embodiment of the present invention.

FIG. 2 is a diagrammatic view of a fluid delivery system in accordance with an embodiment of the present invention. System 200, in one embodiment is configured to receive fluid from a fluid source 210 and apply it to a surface using applicator 260. For example, fluid within fluid source 210 may comprise paint, a plural component, or another suitable fluid. In one embodiment, fluid source 210 is received and pressurized by pump 220. While applicator 260, in one embodiment, is configured to spray fluid at a designated pressure, pump 220 may provide the fluid at a pump outlet at a higher pressure than that of applicator 260, in order to account for pressure losses as the fluid is transferred.

In one embodiment, system 200 comprises a heater 240. Heater 240 may be configured to provide an initial source of heat for fluid source 210, for example to bring the fluid to an initial temperature. In one embodiment, heater 240 is configured to provide sufficient heat to bring fluid source 210 substantially to a desired applicator temperature. However, in other embodiments, heater 240 may heat fluid source 210 to a higher than applicator temperature, or a lower than applicator temperature depending on the application at hand. While heater 240 provides an initial source of heat, the temperature of the fluid may decrease as the fluid is transported to an application point due to imperfect insulation and ambient conditions.

System 200 also comprises a transport mechanism 250. In one embodiment, transport mechanism 250 comprises a conduit running from pump 220 to applicator 260. In one embodiment, transport mechanism 250 comprises both a hydraulic component 254 and an electrical component 252. Hydraulic component 254 comprises a fluid conduit configured to transport a heated fluid from pump 220 to applicator 260. In one embodiment, electrical component 252 comprises a heating element configured to heat fluid within conduit 254. In one embodiment, heating element 252 is an internal heating element located within hydraulic component 254. In one embodiment, heating element 252 is configured to heat fluid within hydraulic component 254 to a desired application temperature.

In one embodiment, system 200 comprises a controller 230 configured to provide control signals to pump 220, heater 240, and/or transport mechanism 250. While only one controller 230 is shown in FIG. 2, illustratively each of the pump 220, heater 240, and transport 250 may receive signals from different individual controllers 230, in one embodiment. Controller 230 may comprise a user interface where a user may set an applicator pressure. Controller 230 may then relay the applicator pressure to pump 220 which may provide fluid at a pressure such that, once the fluid has passed through transport mechanism 250, to applicator 260, it arrives at the desired application pressure. Controller 230 may also send a control signal to heater 240, for example, based on a user selected temperature, to heat fluid to a temperature, and sends another control signal to transport mechanism 250 such that enough heat is provided to maintain, increase, or decrease the fluid temperature to a desired applicator temperature. In one embodiment, controller 230 is configured to provide a control signal to heater 240 such that heater 240 will heat the fluid to a temperature less than applicator temperature, and transport mechanism 250 provides additional heat to raise the heat of the fluid to the desired applicator temperature.

System 200 illustratively includes a single transport mechanism 250. However, in other embodiments, multiple transport systems 250 are used, either in series (in order to cover a greater distance between fluid source 210 and applicator 260, for example) or in parallel (for example, to provide plural components from multiple fluid sources 210 to applicator 260), or both.

Figure 3:
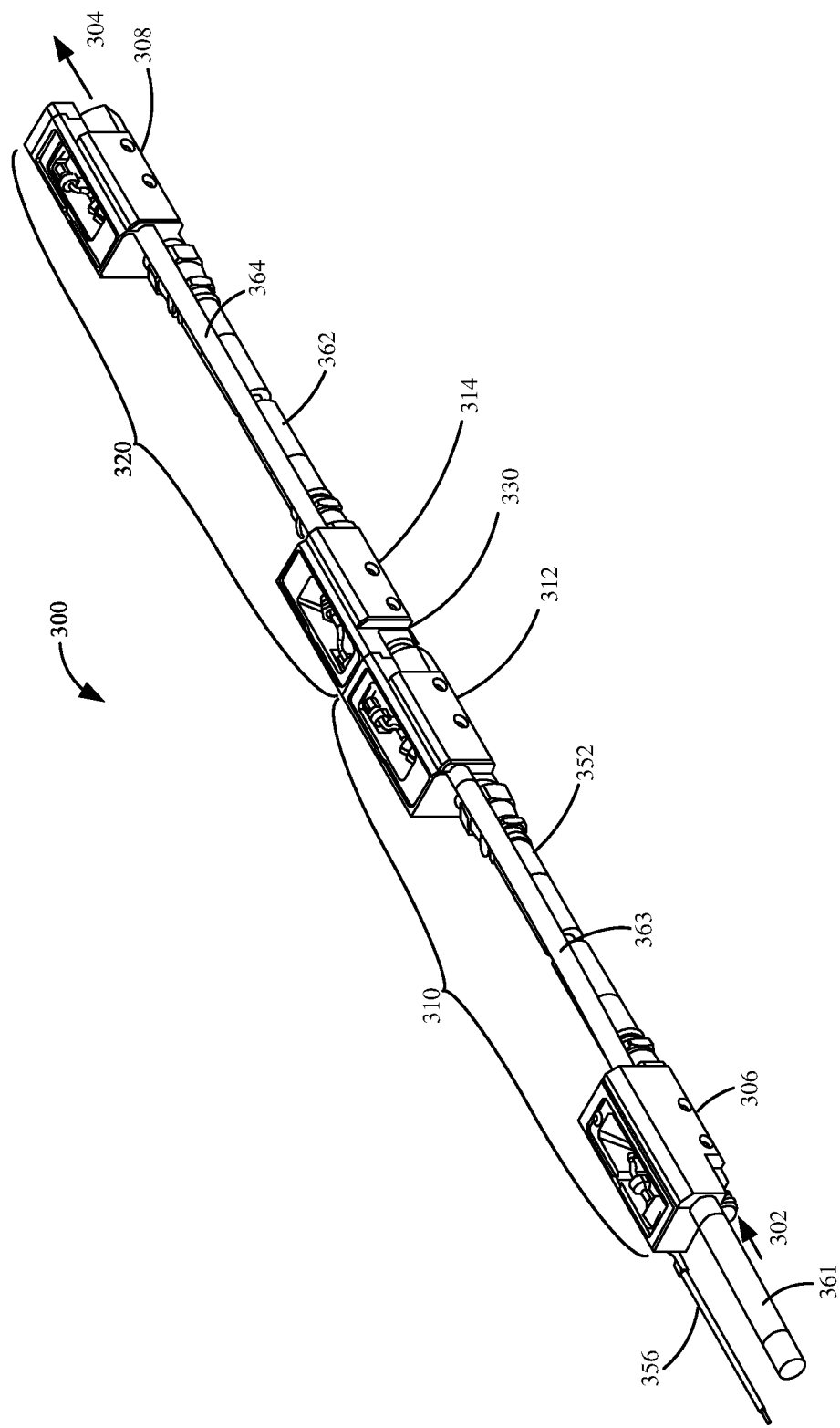
FIG. 3 is a view of a modular fluid delivery system in accordance with an embodiment of the present invention.

FIG. 3 is a view of a modular fluid delivery system in accordance with an embodiment of the present invention. System 300 illustratively includes two fluid transport modules 310 and 320, hydraulically and electrically coupled at coupling point 330. The series of fluid transport modules 310 and 320 may, for example, serve as a transport mechanism 250, described with respect to FIG. 2. In one embodiment, each of fluid transport modules 310 and 320 comprise a hydraulic component and an electrical component—for example a heating element within a fluid conduit. In one embodiment, fluid transport modules 310 and 320 are connected in series such that fluid is received at an inlet 302, for example from either a pump or a heating system, and exits through an outlet 304, coupled to an applicator, for example.

Previously, it has been difficult to provide fluid in an internally-heated conduit over different distances with a single system. For example, a consumer may buy a 100 foot internally heated hose assembly. If the user needs to cover a 200-foot distance from fluid source to applicator, a whole new 200-foot hose assembly may be required, as most internal heating systems are not configured such that they can be connected in series. Modular hose assembly 300 provides one example solution.

Each of fluid transport modules 310 and 320 are configured to be coupled in series, allowing a user to extend an operational length of a fluid transport system. FIG. 3 shows a relatively short modular hose assembly 300, for the purposes of illustration. Each of fluid transport modules 310 and 320 can, illustratively, be any length. For example, in one embodiment, fluid transport modules 310 and 320 are substantially the same length. In another embodiment, fluid transport modules 310 and 320 are different lengths. In one embodiment, each fluid transport module is substantially 100 feet in length, when empty. In another embodiment, fluid transport modules can be configured to be 10 feet, 20 feet, 30 feet, 50 feet, 100 feet, 200 feet, or any other suitable length.

In an embodiment where fluid transport module 310 is coupled to a fluid source, first fluid transport module 310 receives fluid at an inlet coupling component 306. Inlet coupling component 306 is configured to couple, for example, to a fluid pump system in order to receive a pressurized fluid. However, in another embodiment, coupling component 306 is configured to couple to another fluid transport module such that modular hose assembly 300 is extendible to any desired length. Inlet coupling component 306, in one embodiment, comprises a material rated for high pressure applications, such that it can safely house fluid pressurized by a pump. For example, in one embodiment, inlet coupling component 306 comprises a metal housing, for example steel, stainless steel, aluminum, or any other suitable material. Inlet coupling component 306 is configured to couple, in one embodiment to an incoming electronics line 361, a ground wire 356, and a fluid inlet 302.

Fluid inlet 302, in one embodiment, couples to fluid channel 352. In one embodiment, fluid channel 352 also comprises electronics running from inlet coupling component 306 to a first fluid transport module coupling component 312. However, it is important that when the electronics are coupled between, for example fluid transport modules 310 and 320, that the electronics are not coupled in such a way that they are exposed to the fluid. Therefore, in one embodiment, shown for example in more detail in FIGS. 4A and 4B, electronics are configured to be separated from a fluid conduit, such that each travels through a separate chamber within coupling component 312. This ensures that the electronics couple from a first fluid transport module 310, to a second fluid transport module 320, in a dry environment.

Fluid and electronics within line 352 travel from fluid transport module 310, and are received by fluid transport module 320 through a second fluid transport module coupling component 314. In one embodiment, second fluid transport module coupling component 314 is configured to separately the electronics component from fluid transport module 310, and couple it an electronics component associated with second fluid transport module 320. Similarly, second fluid transport module coupling component 314 is configured to receive a separated electronics element from first fluid transport module coupling component, and join the received electronics component to conduit 362, such that the fluid conduit 362 is internally heated by the electronic heating system.

In one embodiment, electronics 361, 363 and 364 comprise a loop that runs substantially from a controller, located at the pump location, to an applicator, located at an outlet. In order to complete a control loop, it is necessary for a return line to return back from the applicator to the pump. Electronics 363 forms the return line, in one embodiment, and comprises a neutral wire that completes the control loop, and runs from the applicator back to the controller. In one embodiment, the return line is separated from electronics line 361, such that it can be electronically coupled between fluid transport components 310 and 320. In one embodiment, electronics 364 forms a return line for second fluid transport module 320 and is configured to electronically couple to the return line of electronics 363 as fluid transport module coupling component 312 couples to second fluid transport module coupling component 314.

In one embodiment, second fluid transport module 320 also comprises an outlet coupling component 308, configured to separately couple a hydraulic and electrical component to, for example, a fluid applicator (not shown). In one embodiment, each of coupling components 306, 312, 314, and 308 function substantially similarly, such that each is configured to separately couple an electronic component (such as heating element and/or return line), and a hydraulic component, between fluid transport modules, such as modules 310 and 320.

In one embodiment, each of components 306, 308, 312 and 314 have a directionality, such that one end is configured to receive a fluid transport module with an internally-located electrical component, and the other end is configured to provide the separated hydraulic component and electrical component for coupling to another fluid transport module. In one embodiment, a user (for example, a purchaser of multiple fluid transport modules 310 and/or 320), can, therefore, join each fluid transport module in an end-to-end configuration in order to obtain a longer fluid delivery system than that shown in FIG. 3. When connected, the modular fluid assembly is configured to provide both electrical and hydraulic coupling from a controller to an applicator, such that controller can provide a signal to bring fluid to a desired internal temperature through transport system 300.

Figure 4A:
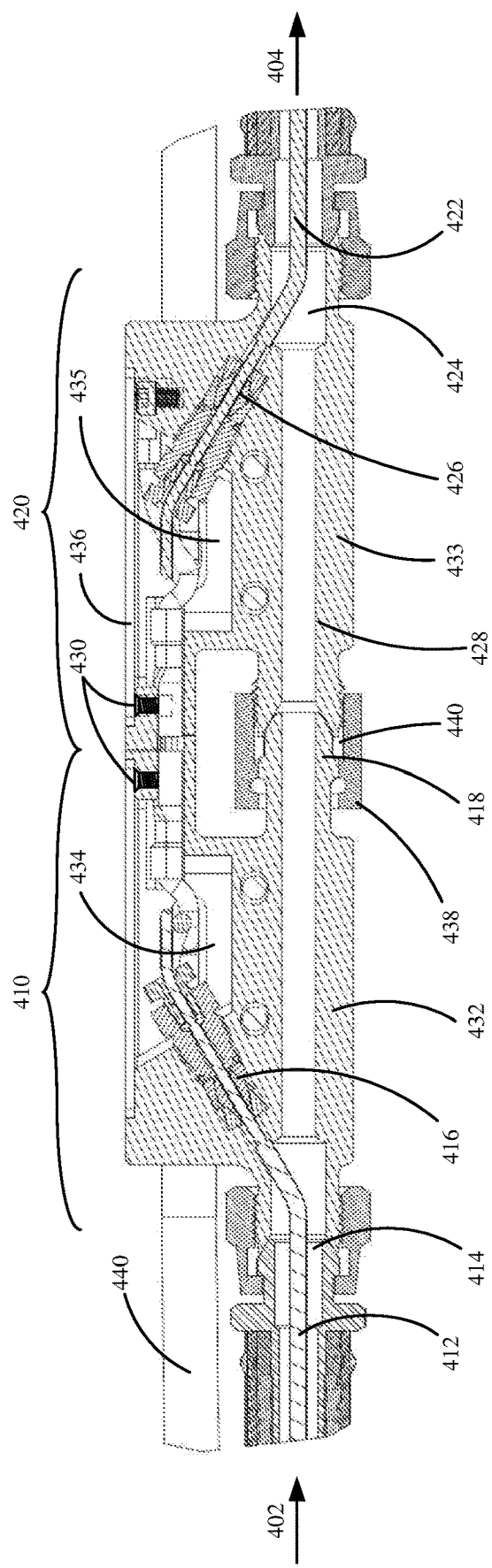
FIGS. 4A and 4B are close-up views of an example of a modular connection assembly in accordance with an embodiment of the present invention.
Figure 4B:
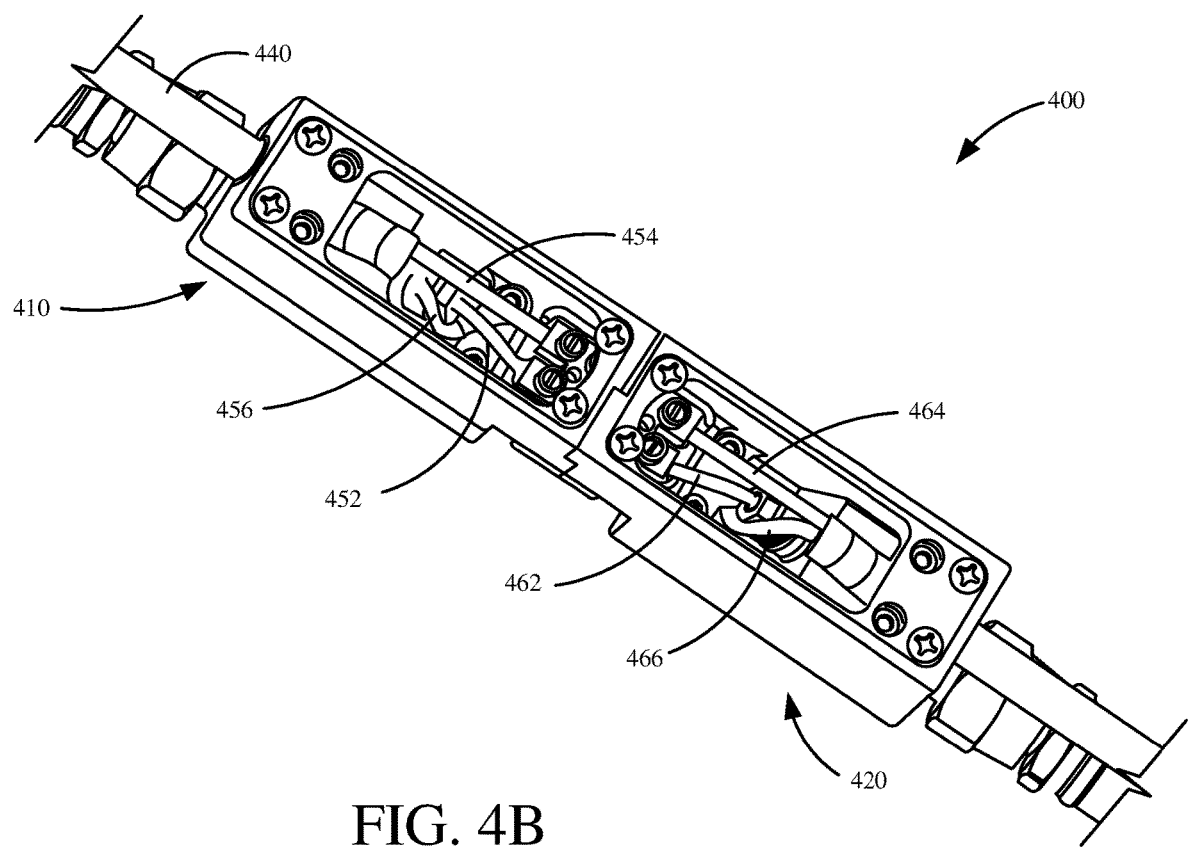

FIGS. 4A and 4B are close-up views of an example modular connection assembly in accordance with an embodiment of the present invention. FIG. 4A illustrates a cross-sectional view of a coupling 400 between a first fluid transport module coupling portion 410 and a second fluid transport module coupling portion 420 within a fluid delivery system. In one embodiment, each of fluid transport module coupling portions 410 and 420 may be configured to couple to a pressurization system for a fluid, a heating system, a fluid applicator, to other modular sections (e.g. to each other, as shown in FIG. 4A), or any combination thereof.

In one embodiment, fluid is configured to flow through connection 400 from an inlet 402, to an outlet 404. As illustrated in FIG. 4, an internal heating element 412, in one embodiment, is located within a fluid channel 414 as it approaches connection 400. As fluid flows through fluid transport module coupling portion 410, heating element 412 is separated from fluid channel 414, such that it can be separately coupled to another fluid transport module in a fluid-free environment. In one embodiment, heating element 412, once separated from fluid channel 414, passes through a seal 416 that is configured to keep fluid from entering an electrical chamber 434. In one embodiment, seal 416 is a pressure-based seal configured to apply a high pressure in order to keep fluid outside of electrical chamber 434. In one embodiment, electrical chamber 434 is configured to provide heating element 412 for coupling to heating element 422 in an environment free of fluid transported by the fluid transport system. For example, in one embodiment, electrical chamber 434 comprises a dry chamber.

Fluid from conduit 414 continues to travel into a fluid chamber 432, which, in one embodiment, is physically separate from electrical chamber 434. In one embodiment, when fluid transport module coupling portion 410 is coupled to fluid transport module coupling portion 420, heating element 412 is coupled to heating element 422, and fluid channel 414 is coupled to fluid channel 424. The coupling 400 takes place, in one embodiment, along a coupling plane 440 where module 410 couples to module 420.

In one embodiment, fluid transport module coupling portions 410 and 420 have a directionality defined by an inlet and an outlet, such that fluid is configured to travel only one way through the module. In an embodiment where modules have directionality, each has a different coupling mechanism configured to assist a user in correctly coupling fluid transport modules. For example, in one embodiment, fluid transport module coupling portion 410 comprises a coupling portion 418 configured to be received by a coupling portion 428, of fluid transport module coupling portion 420. However, in other embodiments, other coupling configurations can also be used so long that a sufficient seal is provided to keep fluid from electrical chamber 434. For example, in one embodiment, seal 438 is provided as a secondary leak-prevention mechanism.

In one embodiment, each of fluid transport module coupling portions 410 and 420 comprise a cover 436 attached by one or more cover fasteners 430. In one embodiment, cover 436 is attached to a fluid transport, module coupling portion by one or more screws, for example, as shown in FIG. 4A. However, in other embodiments, other fastening mechanisms could be used, or modular connection mechanisms could have no removable cover and be substantially inaccessible by a user, or have an inaccessible housing. However, it may be beneficial for a user to access electrical chamber 434, for example in the event that wiring needs to be checked, replaced, or other minor damage needs to be repaired. In one embodiment, as heating element 422 leaves electrical chamber 435, it passes through seal 426, which is configured to provide a seal between electrical chamber 435 and fluid chamber 433, such that it maintains a seal between fluid chamber 433 and electrical chamber 435. Heating element 422 is then introduced into fluid conduit 424 to provide a source of internal, heating along the rest of a fluid transport module associated with fluid transport module coupling portion 420.

FIG. 4B illustrates a substantially top down view of coupling 400 between fluid transport module coupling portions 410 and 420. In one embodiment, for example that as shown in FIG. 4B, covers 436 are removed for illustration purposes only.

In one embodiment, return line portion 464 is received, from fluid transport module coupling portion 420, by fluid transport module coupling portion 410, and electronically coupled to return line portion 454, as shown in FIG. 4B. In one embodiment, fluid transport module coupling portion 410 also comprises a ground wire 456. Fluid transport module coupling portion 410, in, one embodiment, also receives a heating element 452, for example separated from a fluid line, which is then electronically coupled to heating element 462 of fluid transport module coupling portion 420. The coupling between heating elements 452 and 462, and return line portions 464 and 454, in one embodiment, is achieved using terminal blocks, such as that shown in FIG. 4B. However, in other embodiments, other electronic coupling mechanisms may be used, for example spade terminal connectors are also used. In one embodiment, each fluid line requires its own return line for each section. However, as described below with respect to FIG. 5, some plural component systems may be able to share a return line, reducing the amount of wires required for a control loop within a plural component system.

Previous designs have coupled a return line to an internal heating component, such that both the heating component and return line travel within a fluid conduit. Separating the return line from the internal heating component reduces the risk of component failure, and also allows for improved access to the return line. Since only the internal heating component is traveling through a fluid conduit at a time, higher quantities of heat can be provided. Additionally, having only one wire, or one wire heating system, within a fluid conduit also allows for a design where no tight bend is required at an outlet point, such as an applicator, while still completing a control loop. Additionally, fixing the wire at one or more modular connection points ensures that the wire does not move around as much within the fluid conduit, potentially causing damage. Additionally, separating the return wire from the internally heated hose may allow for improved access for repair.

Figure 5:
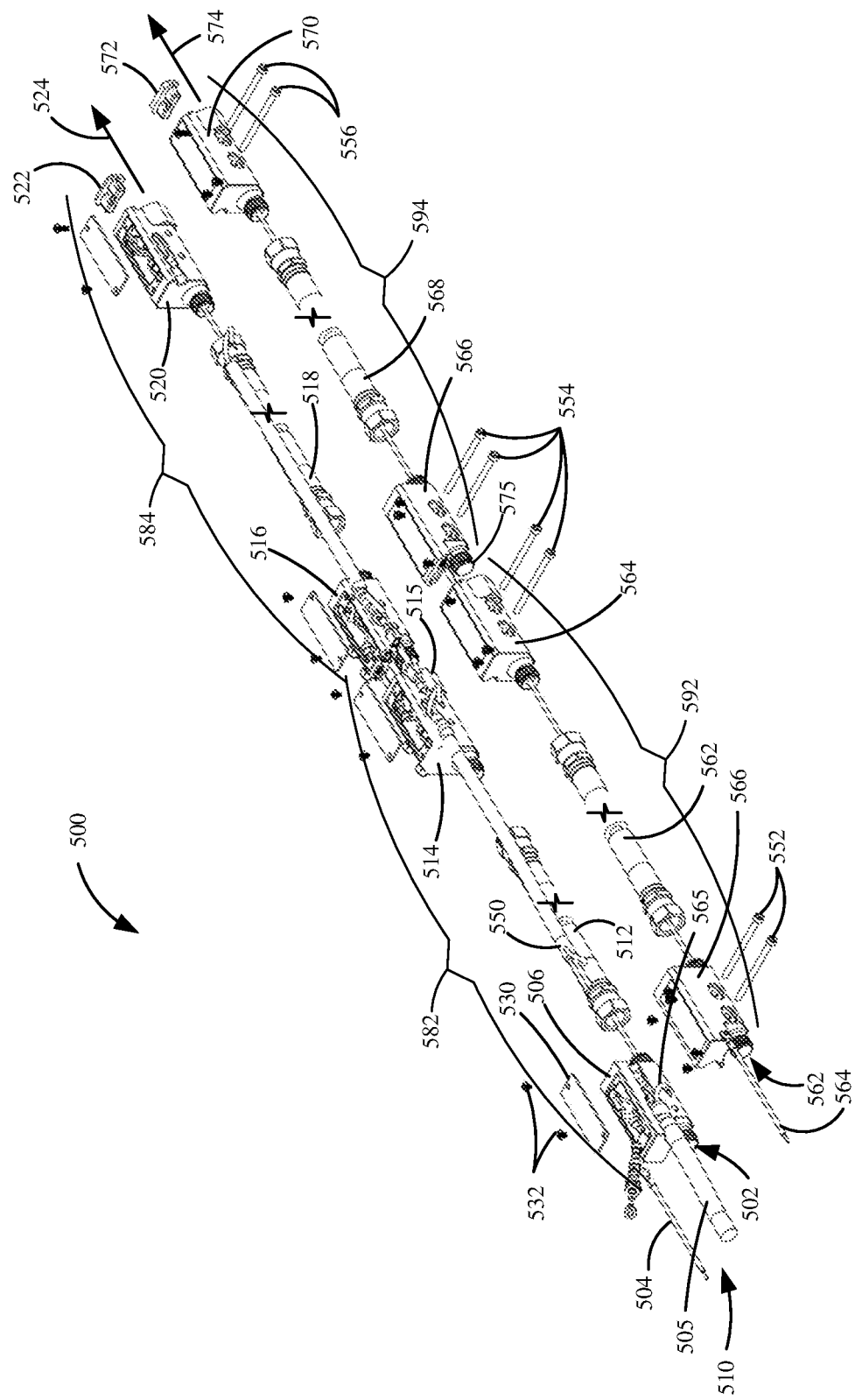
FIG. 5 illustrates an exploded view of an example of a plural component modular fluid delivery system in accordance with an embodiment of the present invention.

FIG. 5 illustrates an exploded view of an example of a plural component modular fluid delivery system in accordance with an embodiment of the present invention. While embodiments described herein thus have been described in the context of a single fluid transport system, it is also to be understood that such systems may operate in parallel, as well as in series, in order to provide plural components from multiple fluid sources to a single fluid outlet. System 500 illustrates one example transport system for a plural component system.

In one embodiment, a first fluid component is received at a first component inlet 502, where it travels through a first component first fluid transport module 512, a first component second fluid transport module 518, and exits through an outlet 524. First component inlet coupling mechanism 506, in one embodiment, is configured to receive fluid, from a fluid source, through inlet 502, and receive a first electronics component from electronics source 505. Electronics source 505, in one embodiment, is configured to provide a source of internal heat to each of fluid component lines 512 and 562. In one embodiment, electronics source 505 is communicably coupled to a controller, such that a first amount of electricity is provided to heat a first component to a desired temperature as it travels from inlet 502 to outlet 524, and a second amount of electricity is provided to a second component to a desired temperature as it travels from inlet 562 to outlet 574. First inlet coupling mechanism 506 may also be configured to receive an incoming ground wire 504, in one embodiment.

In one embodiment, first component inlet coupling mechanism 506 comprises a cover 530 with one or more cover fasteners 532. In one embodiment, first component first fluid transport module 512 is internally heated, such that first component inlet coupling mechanism 506 is configured to join electronics received from inlet 505 with first component fluid line 502, such that an internal heating mechanism travels through first component fluid conduit 512 to a first component first connecting mechanism 514.

First component first connecting mechanism 514 is configured to couple to first component second connecting mechanism 516, such that a first fluid transport module 582 is coupled to a second fluid transport module 584 between inlet 502 and outlet 524. The connection between modules 514 and 516, in one embodiment, comprises both an electrical and a hydraulic coupling. For example, the coupling may be similar to that illustrated in FIG. 4B, such that a heating element within conduit 512 is separated out from a fluid conduit within module 514, and the hydraulic component and electric component are separately coupled at first component connection point 515.

In one embodiment, first component second connecting mechanism 516 is configured to receive a heating element from first component first connecting mechanism 514, and provide the heating element back into fluid path 518 of fluid transport module 584, such that fluid traveling through conduit 518 is internally heated. First component fluid conduit 518, in one embodiment, couples to a first component outlet coupling mechanism 520.

In the embodiment illustrated in FIG. 5, fluid transport modules 582 and 584 are connected in series, however it is to be understood that more than two fluid transport modules may be connected, in other embodiments, for example three, four, or more. Each of fluid transport modules 582 and 584 may be much longer than indicated in FIG. 5, which shows only a portion of each fluid line 512 and 518. However, each fluid module may be any length—for example 10 feet, 20 feet, 50 feet, 100 feet, or any other selectable length. For ease of explanation, each of modules 582 and 584 are described as substantially 100 feet in length, when empty. A user may, using multiple fluid transport modules, be able to couple multiple module fluid lines together in order to achieve a fluid delivery path of substantially 200, 300, 400, 500 feet or higher, depending on the fluid application at hand. First component outlet coupling mechanism 520, in one embodiment, is configured to provide fluid from first component fluid conduit 518, to an applicator. However, when not in use, first component inlet coupling mechanism 520 may be configured to receive a first component outlet cover 522, for example in order to protect electronics from damage. Electronics may, therefore, in one embodiment, be configured to couple to a sensor at a first component inlet coupling mechanism 520, for example such that a user can monitor an applicator temperature or pressure at an applicator.

As illustrated in FIG. 5, each of coupling components 506, 512, 514 and 520 may comprise covers 530, with fasteners 532, such that electronic housings are protected from damage, or contact with insulation which is often provided around each of the component fluid paths.

A second plural component may travel along a second component fluid path extending between a second fluid inlet 562 to a second fluid outlet 574, as illustrated in FIG. 5. Second component fluid line 562, in one embodiment, is internally heated. The electronics for both lines 512 and 562, in one embodiment, are provided by a single inlet 505, such that electronics inlet 505 provides an internal heating component 565 to a second component inlet coupling mechanism 566, such that second component module fluid lines 562 and 568 are internally heated. However, in other embodiments, each fluid line receives a separate electronics inlet. Second component inlet coupling mechanism 566 may also be configured to receive a ground 564, in one embodiment. First and second component inlet coupling mechanisms 566 and 506 may be physically coupled together, in one embodiment, in order to prevent jostling or misalignment within a hose covering. Physical coupling may also provide stabilization for component 565, in one embodiment. First and second component inlet coupling mechanisms 506 and 566 may be shaped to accommodate shared electronics return line 550, in one embodiment. One or more fasteners 552 may be configured to couple first and second component inlet coupling mechanisms 506 and 566 together.

Second component first fluid conduit 562 may be configured to couple, in one embodiment, to second component second fluid conduit 568 by a coupling between coupling components 564 and 566. Coupling components 565 and 566 may be configured to, in combination, separate and rejoin a heating element from a fluid conduit, such that both electronic and hydraulic couplings are provide between fluid conduits 562 and 568, of fluid transport modules 592 and 594, respectively. In one embodiment, internal fasteners 554 may be configured to join one or more of coupling components 565 and 566 of second component fluid path 560, to one or more of coupling components 514 and 516 of first component fluid path 510. In one embodiment, second component second module fluid line 568 is configured to deliver fluid to a second component outlet coupling mechanism 570. Second component outlet coupling mechanism 570 may be coupled to first component outlet coupling mechanism 520, in one embodiment, by one or more outlet fasteners 556. In one embodiment, second component outlet coupling mechanism 570 is configured to deliver fluid to an outlet 574. However, when not in use, second component outlet coupling mechanism 570 may comprise a cover 572 configured to protect an electronics outlet from damage when not in use.

Figure 6:
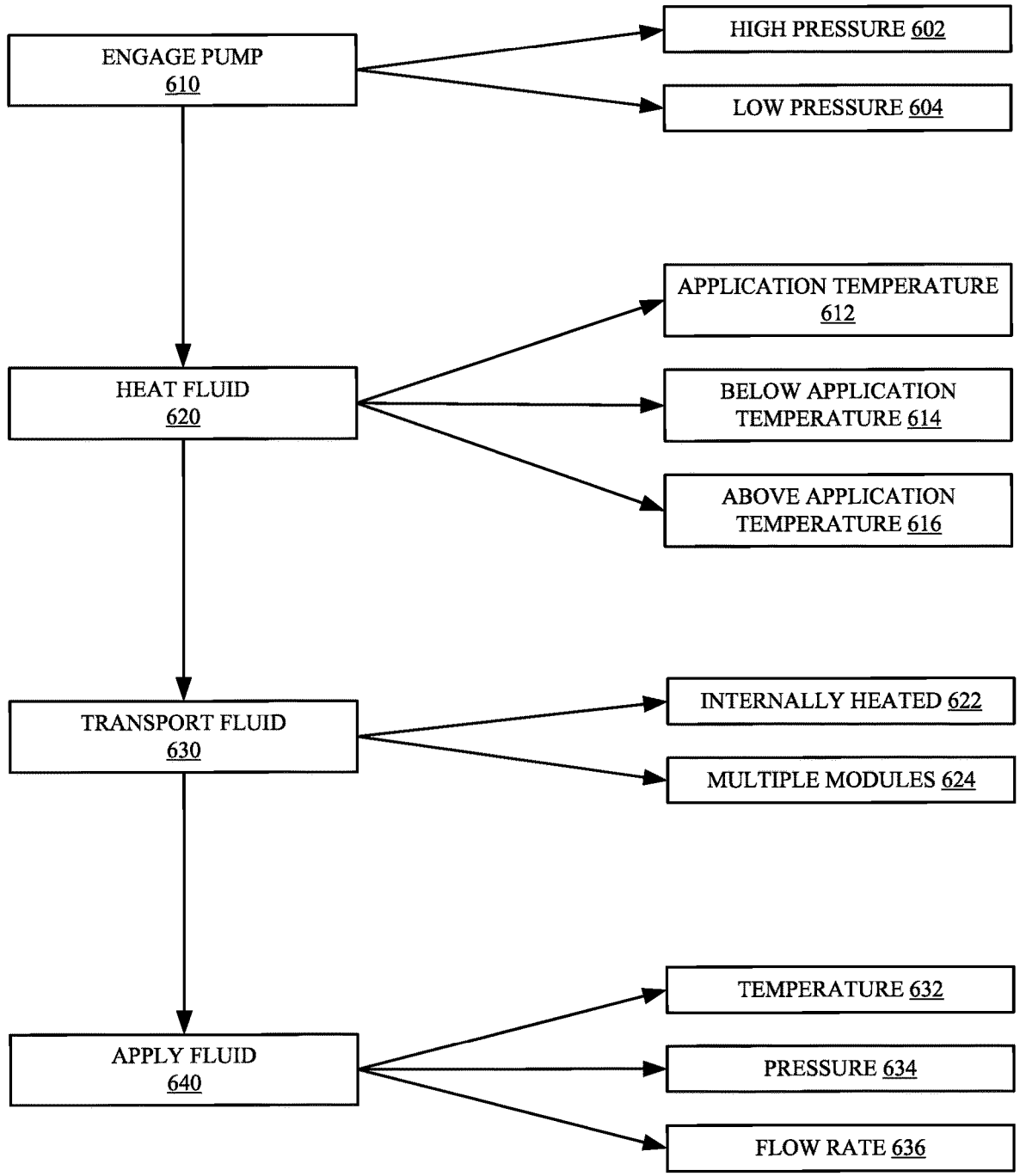
FIG. 6 is a flow diagram of a method of using a fluid application system in accordance with an embodiment of the present invention.
Figure 7:
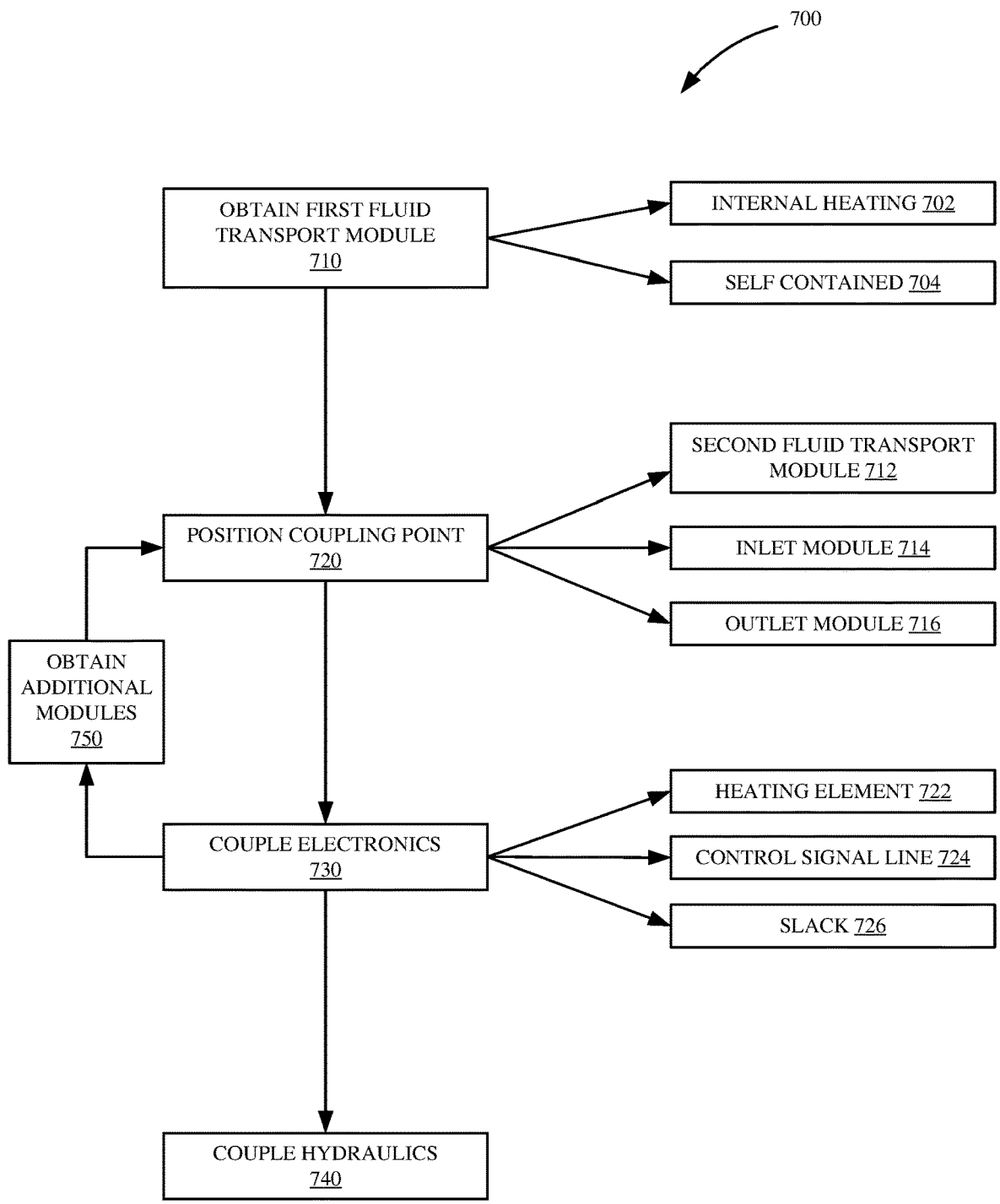
FIG. 7 is a flow diagram of a method of assembling a modular fluid delivery system in accordance with an embodiment of the present invention.

FIG. 6 is a flow diagram of a method of using a fluid application system in accordance with an embodiment of the present invention. Method 600 may comprise a method of use for any of the embodiments described with respect to FIGS. 1-5, for example, or any other appropriate modular fluid application system.

At block 610 a pump is engaged. In one embodiment, the pump is configured to provide fluid for a high pressure application, for example as indicated in block 602, or a low pressure spraying application, for example as indicated at block 604. High pressure may comprise fluid exiting an applicator at, for example substantially 3,000 PSI or higher. Low pressure applications, as indicated in block 604 may comprise fluid releasing the fluid exiting the applicator at substantially lower pressures, for example between 1,000 and 2,000 PSI, or lower pressure. However, engaging the pump, as indicated in block 610, may comprise fluid leaving the pump at higher pressures, in order to account for pressure losses as the fluid is delivered through a transport system, for example a fluid hose.

At block 620, the fluid is initially heated. Many applications require fluid to be heated to an application temperature, as indicated in block 612. The fluid may be heated by a heating system to an application temperature, such that a fluid transport system only needs to maintain that temperature during transportation to an application point. In another embodiment, heating a fluid comprises heating a fluid to a temperature below an application temperature, as indicated in block 614. In some embodiments, a high precision of temperature accuracy may be required, such that internally heated transport system is used to bring the fluid the application temperature, which may provide greater control than using an initial heating assembly, and attempting to account for heat loss through a transport system. In one embodiment, heating the fluid in block 620 comprises heating the fluid to a temperature above the application temperature 616, such that temperature losses occurring over a fluid transport system bring the temperature to a desired application temperature.

At block 630, fluid is transported to an application site. In one embodiment, transporting fluid comprises providing the fluid, under pressure, to an applicator. Transporting fluid may comprise use of internally heated fluid conduits, for example fluid hoses with an internal heating source, such as a wire or wire bundle, as indicated in block 622. In one embodiment, transporting the fluid comprises transporting the fluid through a series of fluid transport modules, as indicated in block 624, between an initial pressurization/heating point and an applicator. Using multiple modules aligned in series may provide some advantages, such that a user can use the same module for multiple applications, for example a 100-foot fluid transport module can also be used as part of a 200 foot internally heated fluid transport assembly.

In block 640, a fluid is applied. In one embodiment, applying a fluid comprises an applicator at least partially atomizing the fluid in a fluid spray. Fluid at the applicator may be required to have an applicator temperature, as indicated in block 632, an applicator pressure, as indicated in block 634, and an applicator flow rate, as indicated in block 636. The ability to control these three process variables may allow for greater consistency in applications from operation to operation. Therefore, it is important that the fluid is not just initially heated, pressurized, and delivered at the desired flow rate by a pump, it also needs to arrive at the applicator with the necessary process parameters. Therefore, in at least some embodiments, transporting the fluid through modular, internally heated components allows for better control over these process variables to better fit a greater range of fluid application operations.

FIG. 7 is a flow diagram of a method of assembling a modular fluid delivery system in accordance with an embodiment of the present invention. Method 700 may be useful for a user needing to extend a fluid transport system across a greater range between a pumping location and an application site.

At block 710, a first fluid transport module is obtained. The first fluid transport module may contain a fluid conduit configured to receive fluid at a first end and deliver fluid at a second end. The conduit may be configured for internal heating, as indicated in block 702. The first module obtained in block 710 may also be self-contained, as indicated in block 704, such that a user can connect the fluid transport module to any of a second fluid transport module, an inlet (E.g. a fluid source), or an outlet (e.g. an applicator) using a coupling mechanism at a connection point on either end of the fluid transport module.

At block 720, the first fluid transport module is positioned at a coupling point. In one embodiment, positioning a module at a coupling point comprises positioning a connection mechanism of the first fluid transport module such that it can be connected to a connection mechanism of a second module, as indicated in block 712. In another embodiment, positioning a coupling point of a first fluid transport module comprises positioning the first fluid transport module such that it can connect to an inlet connection mechanism, as indicated in block 714, for example in order to couple to a pumping assembly, a heating assembly, or to a fluid source. In another embodiment, positing the first fluid transport module at a coupling point comprises positing the first fluid transport module such that it is configured to couple to an outlet connection mechanism, as indicated in block 716, such that it can be connected to an applicator, for example.

In block 730, electronics are coupled between a first fluid transportation module and a coupling point, for example a second fluid transportation module. In one embodiment, coupling electronics comprises coupling a heating element of the first fluid transportation module across the coupling point, as indicated in block 722, such that an internal heating is applied across the coupling, for example. In one embodiment, coupling the electronics comprises coupling a control signal, or return line, as indicated in block 724, such that a control loop is communicably coupled across the coupling point. In one embodiment, coupling electronics comprises introducing some slack into the system, as indicated in block 726. Heating elements may initially be installed within each fluid transportation module such that when coupled, some slack is introduced, such that the length of the heating element is greater than that of the fluid conduit. When a fluid delivery system is cold (not heated in operation), a heating element may be in a contracted position. Unintended jostling of the heating element within a hose may cause damage to the heating element, as the hose when cold, may be in an expanded position. However, introducing slack into the electronics, as indicated in block 726, may comprise introducing enough slack such that, when the fluid transportation module is in a heated position (in operation) the heating element will be in an expanded position, and the tubing will be in a contracted position, as its diameter expands with fluid.

At block 740, hydraulics are coupled across a coupling point. In one embodiment, this comprises coupling a first fluid conduit, of a first fluid transportation module, to a second fluid conduit, of a second fluid transportation module. In one embodiment, coupling hydraulics and coupling electronics, as indicated in blocks 740 and 730, respectively, occurs substantially simultaneously as a user couples one connecting mechanism of a first fluid transport module to a connection mechanism of a second fluid transport module.

At block 750, the steps indicated in blocks 720, 730, and 740 are repeated as necessary to achieve a fluid transport system of a desired length. For example, in one embodiment, each fluid transportation module comprises a fluid conduit of substantially 100 feet in length. Therefore, for an operation requiring a 300-foot fluid transport system, as indicated in block 750, the steps indicated in block 720, 730, and 740 may be repeated two more times in order to achieve the desired length. However, each fluid transportation module can comprise any length, for example 10 feet, 20 feet, 50 feet, 100 feet, or any other suitable length.

At block 760, insulation is applied to the fluid delivery assembly. In one embodiment, insulation is applied to fluid delivery modules, coupled in series and/or in parallel, prior to a final coupling between the fluid delivery assembly and a fluid source or a fluid applicator. In one embodiment, insulating the fluid delivery assembly comprises applying a non-conductive sleeve or coating. The sleeve may be a removeable sleeve, such that a user can remove it to repair damaged fluid transport modules, or to reconfigure a fluid delivery assembly.

Figure 8A:
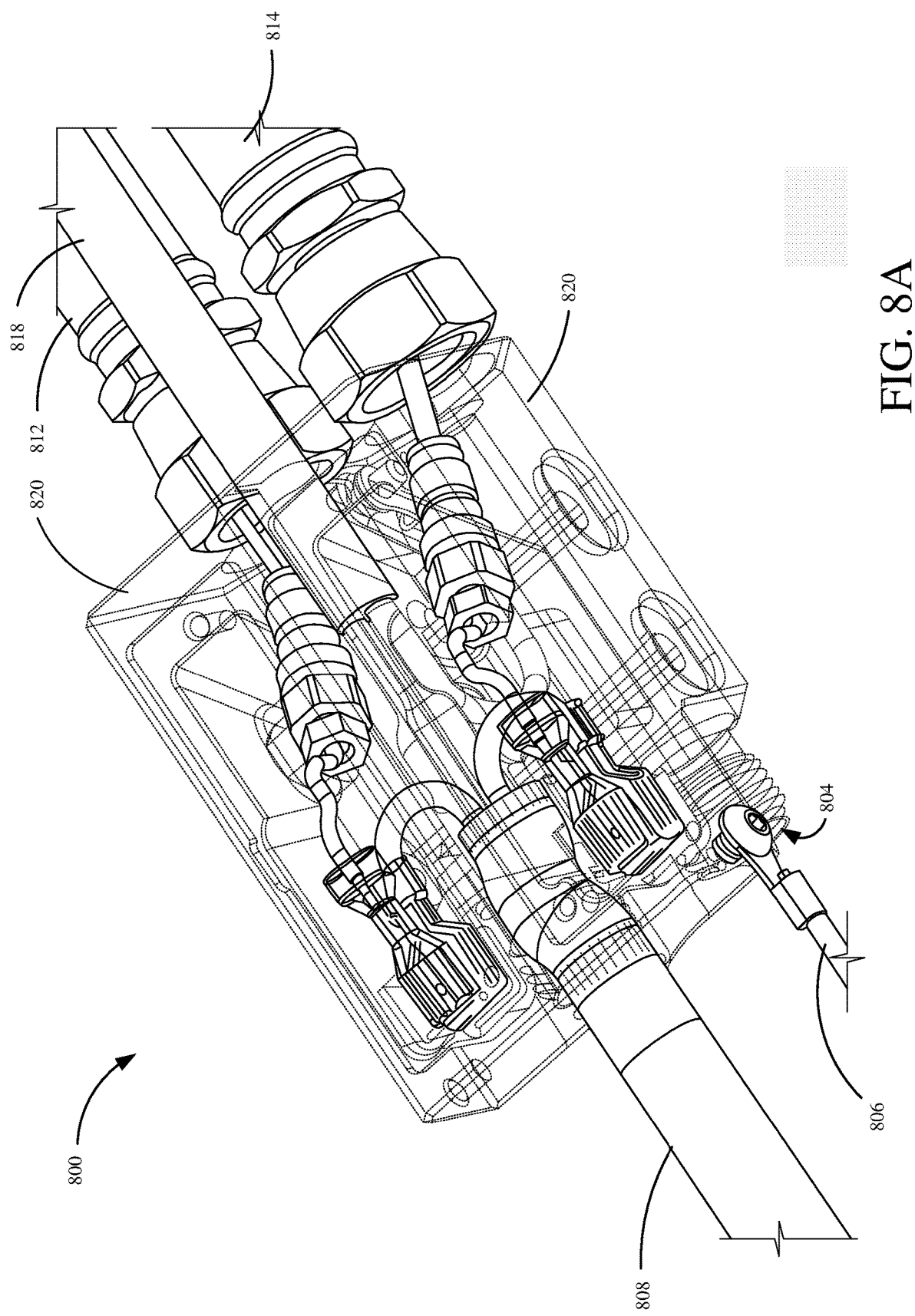
FIGS. 8A and 8B illustrates close-up views of inlet and outlet coupling portions for a plural component modular fluid assembly in accordance with one embodiment of the present invention.
Figure 8B:
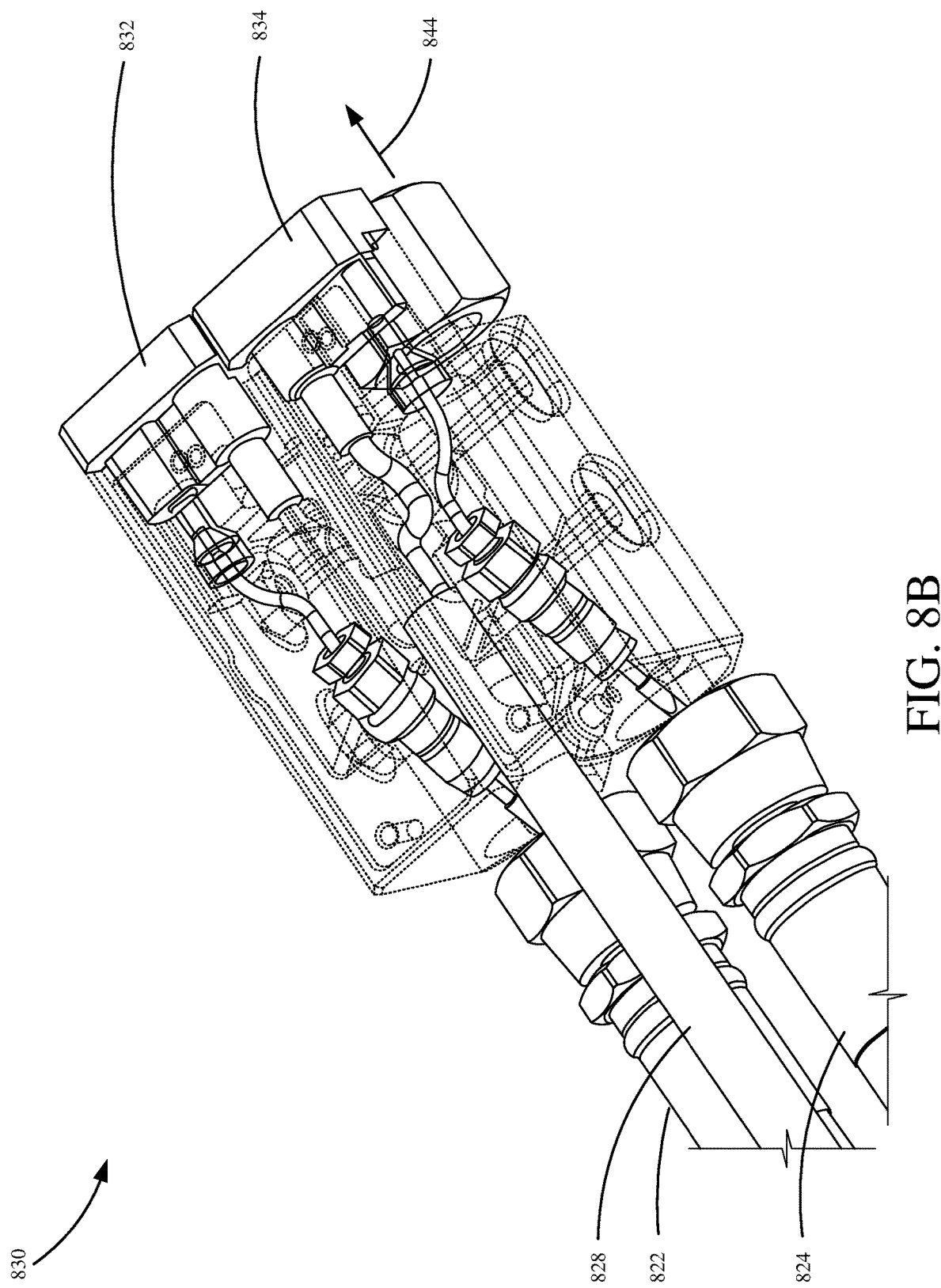

FIGS. 8A and 8B illustrates close-up views of inlet and outlet coupling portions for a plural component modular fluid assembly in accordance with one embodiment of the present invention. In some embodiments of the present invention, modular fluid delivery systems are configured to interconnect, such that a user can create a fluid delivery system with any desired length. However, in some embodiments, each modular fluid delivery system has directionality, such that only one end is configured to receive an incoming fluid, and one end is configured to output a fluid. Additionally, in some embodiments, the modular fluid delivery section configured to couple to a pumping assembly is different than a modular fluid assembly portion that couples internally. Therefore, in some embodiments, modular fluid delivery portions comprise different coupling portions at either end.

FIG. 8A illustrates one embodiment of an inlet coupling component 800. Inlet coupling component 800 is illustrated for a plural component system, and is configured to receive a first inlet component at a fluid inlet and a second inlet component at a second inlet (not shown), Inlet coupling component 800 is also configured to couple to an incoming electrical return line 818 and output an electrical return line 808. Additionally, in one embodiment, inlet coupling component 800 is also configured to receive, an incoming ground line 806.

FIG. 8A shows a detailed view of electrical and fluid couplings within individual component coupling casings 820. As shown in FIG. 8A, and as, described previously with other embodiments, inlet coupling component 800 is configured to receive an incoming fluid source and provide an internally heated fluid output, as indicated by outputs 814 and 812 for each of the plural components. The inlet coupling component 800 is configured to receive electronics, and provide internal heating elements to each of the outgoing internally heated component lines (i.e., outputs 814 and 812).

FIG. 8B illustrates one embodiment of an outlet coupling component 830. Outlet coupling component 830 is configured to receive incoming plural component fluid channels 822 and 824, each of which is internally heated, as illustrated in FIG. 8B. Outlet coupling component 830 is configured to separate the internal heating elements such that fluid can be provided to an outlet 844 for the first plural component, and an outlet for the second plural component (not shown in FIG. 8B). In one embodiment, outlet coupling component 830 comprises caps 832 and 834, associated with the first and second plural components. Caps 832 and 834 are configured to couple to the electrical elements at the end of the fluid transport assembly and provide an electrical bridge between a spade connector and a round connector.

Figure 9A:
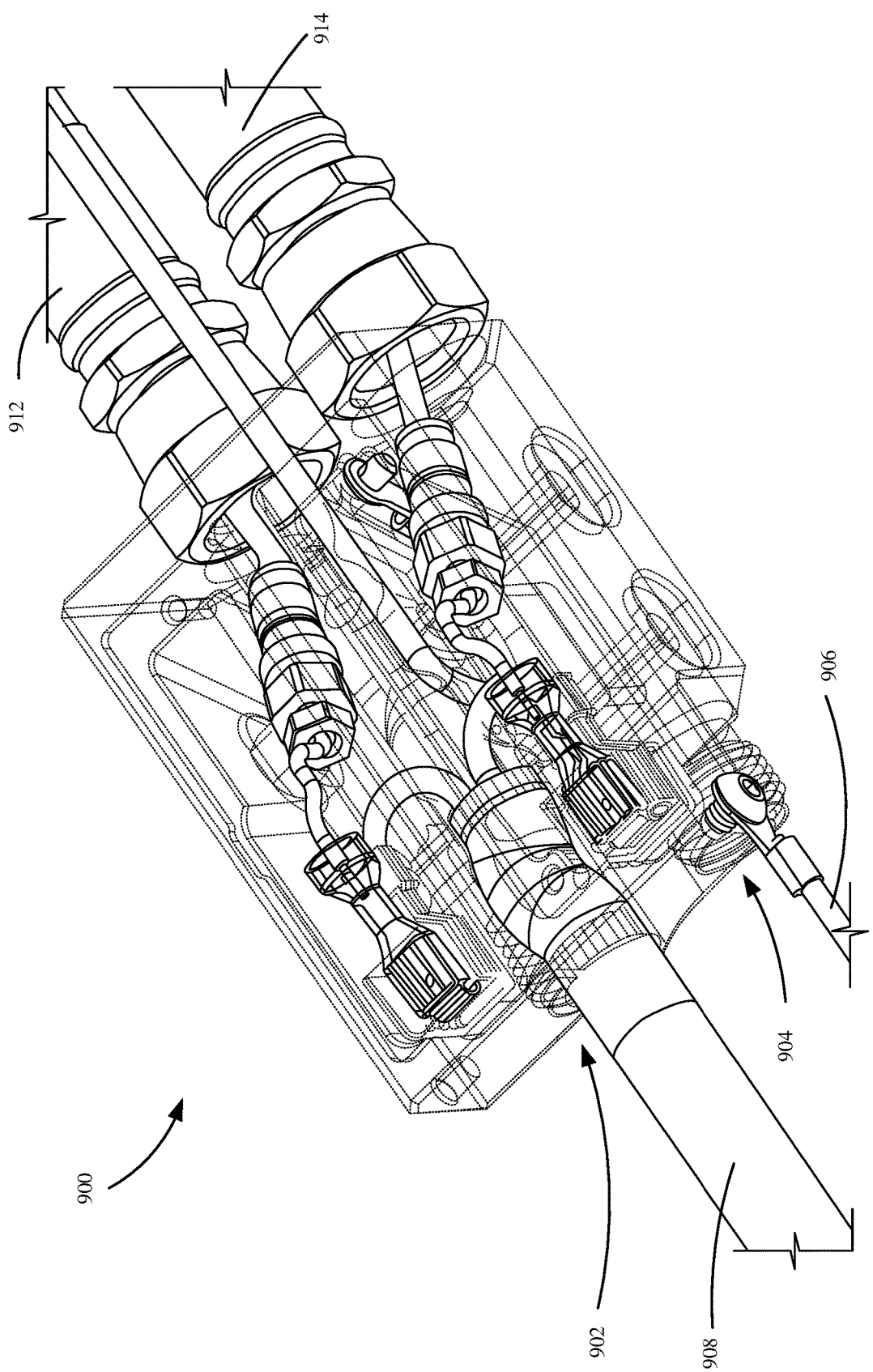
FIGS. 9A-9C illustrate close-up views of inlet, outlet, and internal coupling portions of a plural component modular fluid delivery system in accordance with one embodiment of the present invention.
Figure 9B:
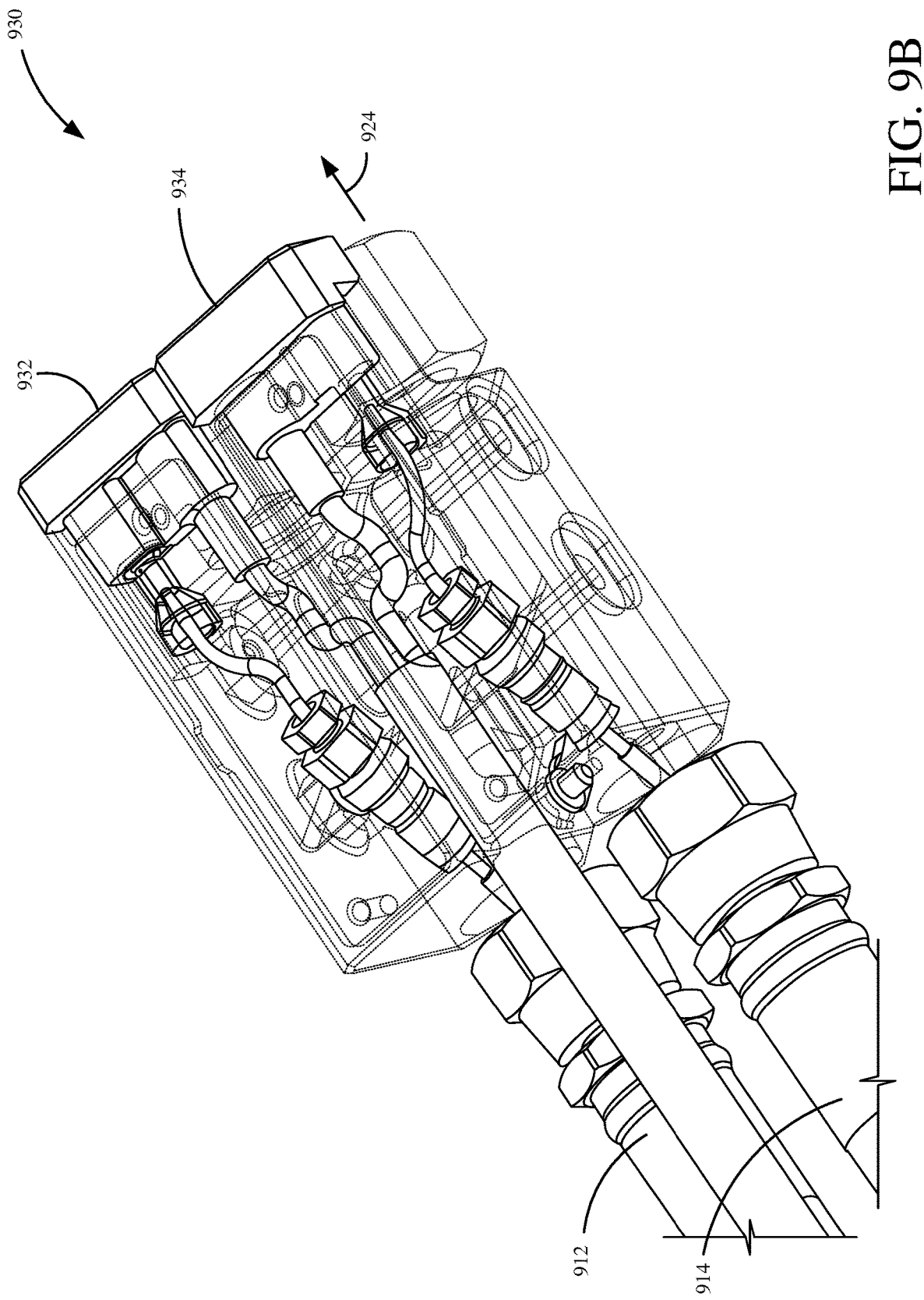
Figure 9C:
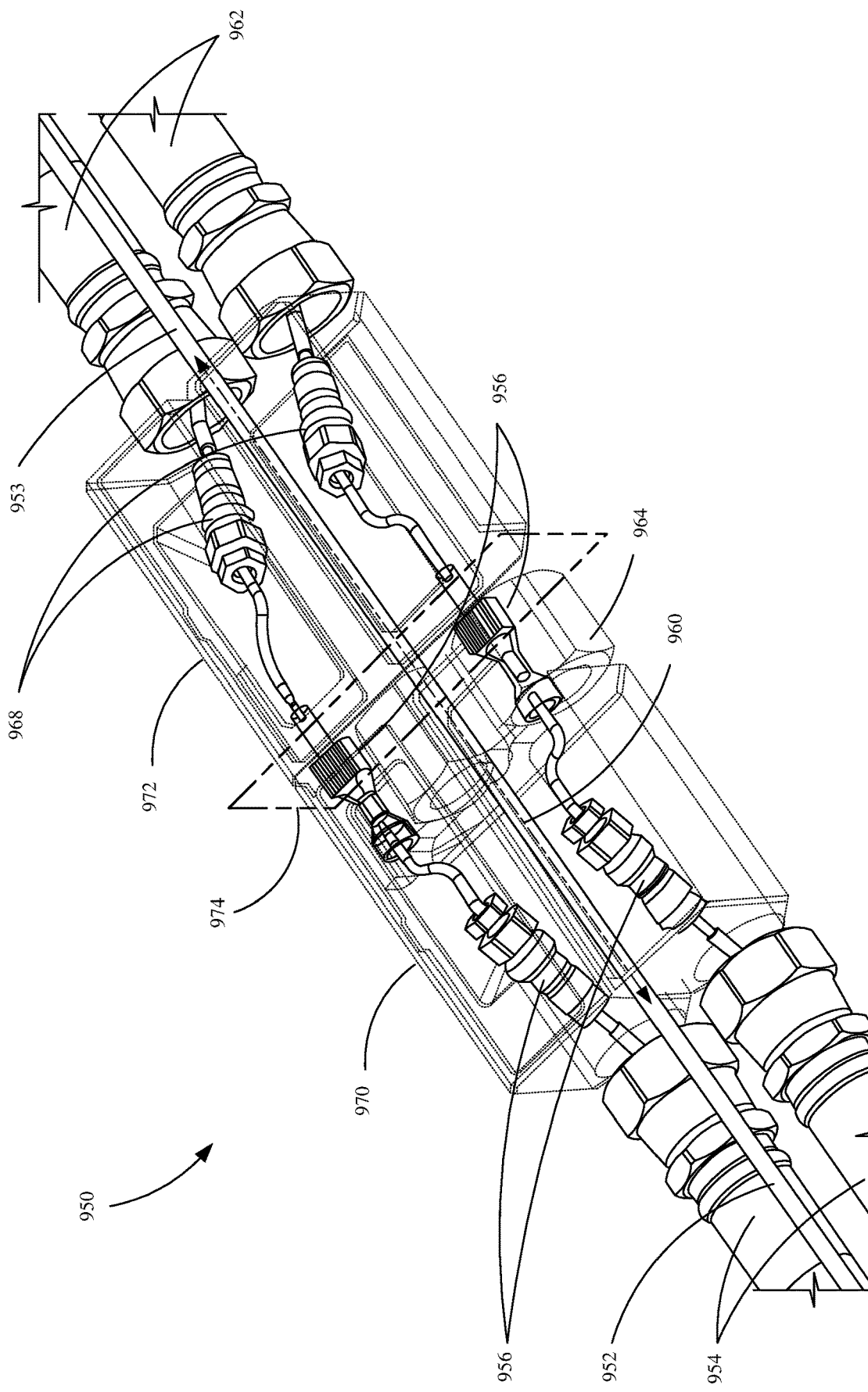

FIGS. 9A-9C illustrate close-up views of inlet, outlet, and internal coupling portions of a plural component modular fluid delivery system in accordance with one embodiment of the present invention. In the embodiment illustrated in FIGS. 9A-9C, a single electrical line 908 is used to provide both a heat source and a return line for the electrical power. Such an embodiment may provide the same amount of heat for each of the plural components. This may be a less desirable configuration in the case where there is a difference in chemical viscosities between plural components in internally-heated plural component lines 912 and 914, and may create an imbalance in pressures at the spray gun between the two plural components. Inlet coupling component 900 comprises an inlet for a first plural component 902, an inlet for a second component 904, an incoming ground line 906, and an electronics out.

FIG. 9B illustrates an outlet coupling component 930 configured to receive incoming internally heated plural component lines 912 and 914, and outputting plural component fluid channel 924 and an outlet for a second plural component (not shown). The outlet coupling portion is configured to separate the heating element from each of the internally heated lines 912 and 914, and provide the element of each of lines 912 and 914 to caps 932 and 934, respectively. Caps 932 and 934 are configured to couple to the electrical elements at the end of the fluid transport assembly and provide an electrical bridge between a spade connector and a round connector.

FIG. 9C illustrates an internal coupling for a plural component fluid delivery system. Incoming fluid lines 954 are configured to couple to outgoing fluid lines 962 at a fluid coupling 964. Incoming electronics 956 are separated from each of the incoming fluid lines, and are configured to couple to outgoing electronics 968 at electrical coupling points 966, as indicated in FIG. 9C. The fluid, coupling 964 and electrical coupling 966 are configured to happen at the joining of each of the internal coupling components 970 and 972. As illustrated in FIG. 9C, inlet, internal coupling component 970 has a directionality, and may, for example, couple to inlet coupling component 900. Internal coupling component 972 also has a directionality and may, for example, couple to outlet coupling component 930. As illustrated in FIG. 9C, plural component modular delivery systems may have internal coupling components (for example 970 and 972) configured such that a mirror axis 960 exists between the two, as shown in FIG. 9C. Internal coupling components 970 and 972 may also be configured to receive an incoming return line 952 and couple it to an outgoing return line 953 at an internal coupling plane 974.

FIGS. 10A-10D illustrate views of modular fluid transport assembly components for a single fluid line in accordance with one embodiment of the present invention. While some embodiments described herein have illustrated modular fluid transport systems in the context of plural components, modular fluid transport assemblies can also be useful for internally heating and transporting a single fluid component. In some embodiments, single fluid transport assemblies also have coupling components with directionality, such that one fluid transport assembly may, for example, be configured to couple to a fluid inlet and an internal coupling point, while a second fluid transport assembly may be configured to couple to an internal coupling point and an outlet, while a third may, for example, only be configured to couple to internal coupling points.

Figure 10A:
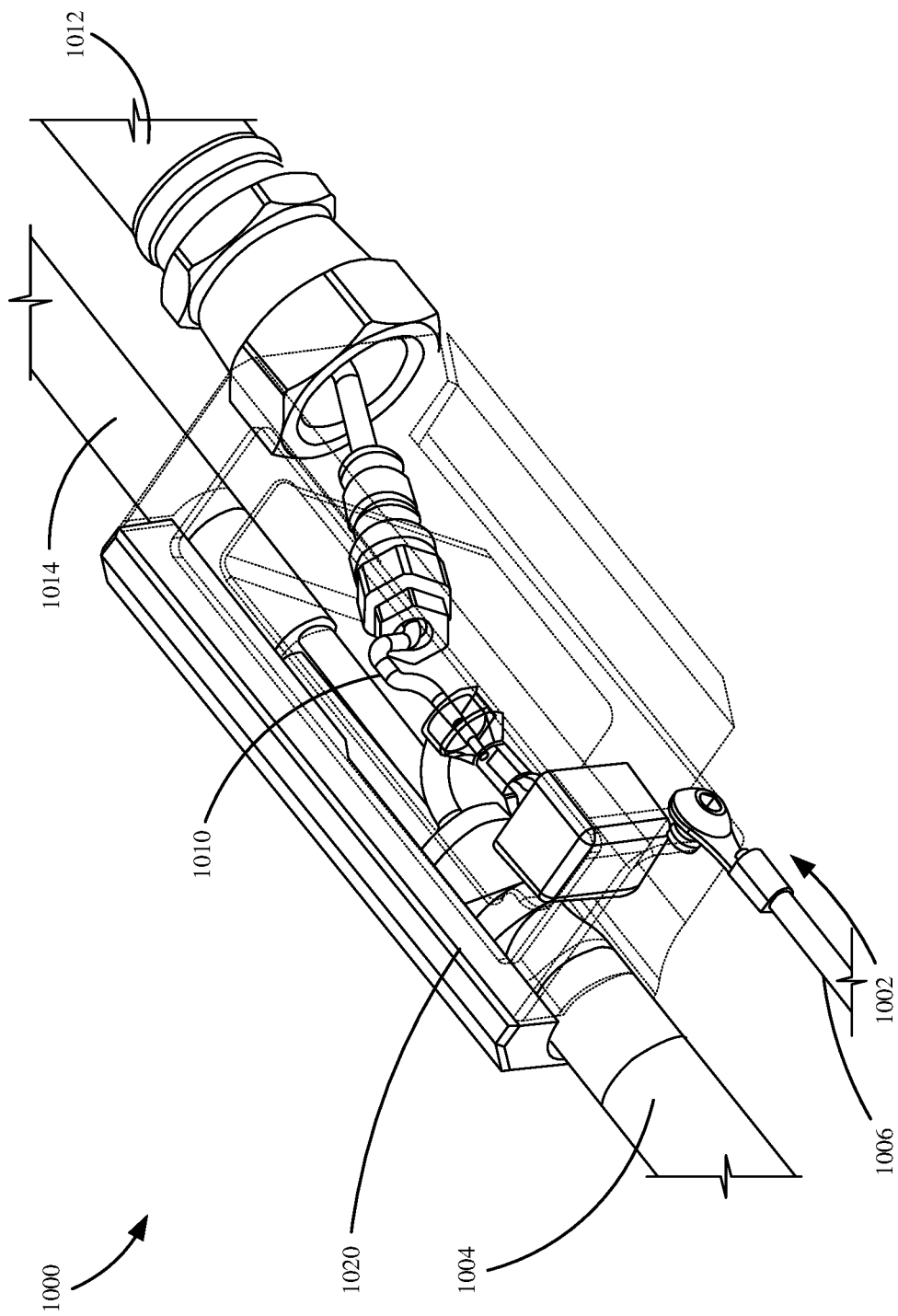
FIGS. 10A-10D illustrate views of modular fluid transport assembly components for a single fluid line in accordance with one embodiment of the present invention

FIG. 10A illustrates an inlet coupling component 1000 configured to receive an incoming fluid at fluid inlet 1002 and output an electronics line 1004. Inlet coupling portion 1000 may also be configured to receive an incoming ground line 1006. As illustrated in FIG. 10A, an outgoing fluid line 1012 is configured to receive an electronics line 1010, which is configured to provide internal heating. Additionally, inlet coupling component 1000 receives an incoming electronics line 1014. Inlet coupling portion also comprises a housing 1020.

Figure 10B:
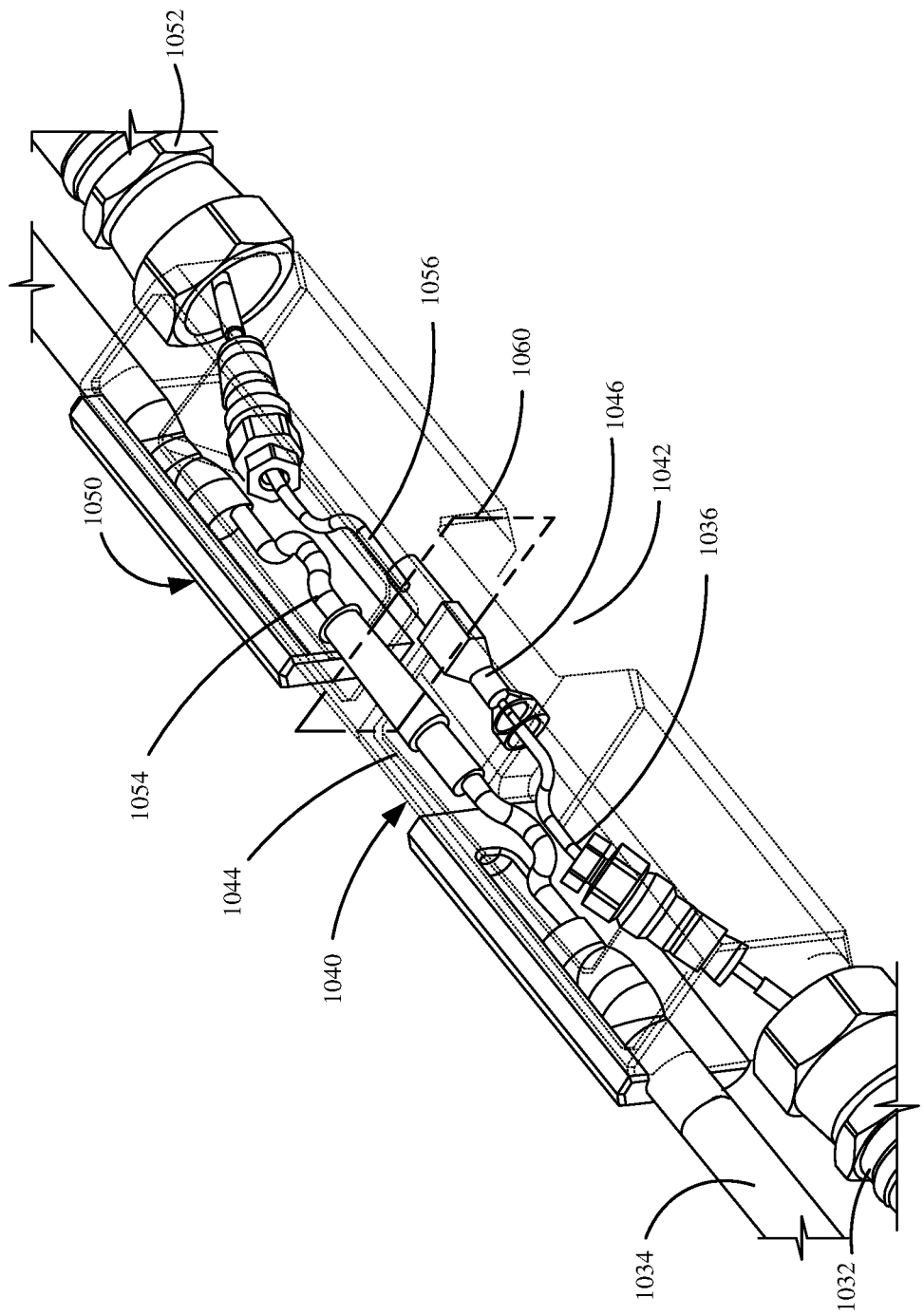

FIG. 10B illustrates an internal coupling between an outgoing internal component 1040 and an incoming internal component 1050. Internal coupling components 1040 and 1050 may be configured, in one embodiment, to couple along coupling plane 1060. Fluid may come in through fluid inlet 1032 within an internal electronics component 1036, separated from the fluid channel within housing 1040, coupled to a corresponding electronics component 1056 across a coupling plane 1060, such that an internally heated fluid line 1052 exits coupling component 1050. Electronics component 1036 is configured to couple to electronics line 1056 across a coupling plane at an electronics coupling point 1046. Incoming fluid line 1032 is configured to couple to outgoing fluid line 1052 at fluid coupling point 1042 which may also be within coupling plane 1060. Additionally, in one embodiment, a return line 1054 enters internal coupling component 1050, and couples to exiting return line 1044 across coupling plane 1060.

Figure 10C:
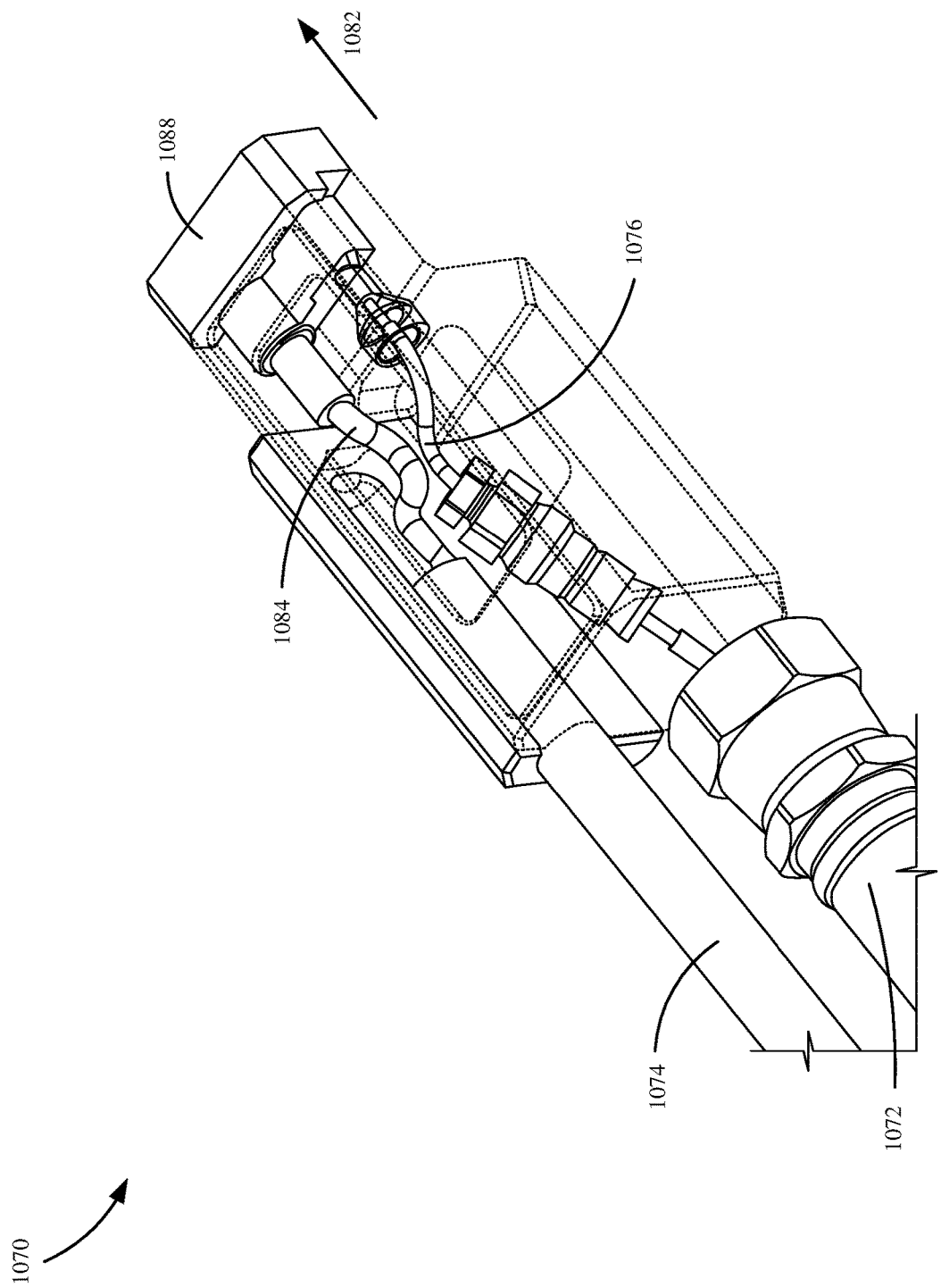

FIG. 10C illustrates one embodiment of an outlet coupling component 1070 for a single component modular fluid transport assembly. Incoming fluid line 1072 is configured to enter outlet coupling portion 1070, and fluid is configured to exit, for example as indicated at outlet 1082. Outlet coupling component 1070 is configured to separate electronics component 1076, and provide a coupling to an endcap 1088. Cap 1088 may also be configured to output a return line 1084 which is configured to exit outlet coupling component 1070 as return line 1074. Cap 1088, in one embodiment, is configured to couple to the electrical elements at the end of the fluid transport assembly and provide an electrical bridge between a spade connector and a round connector.

Figure 10D:
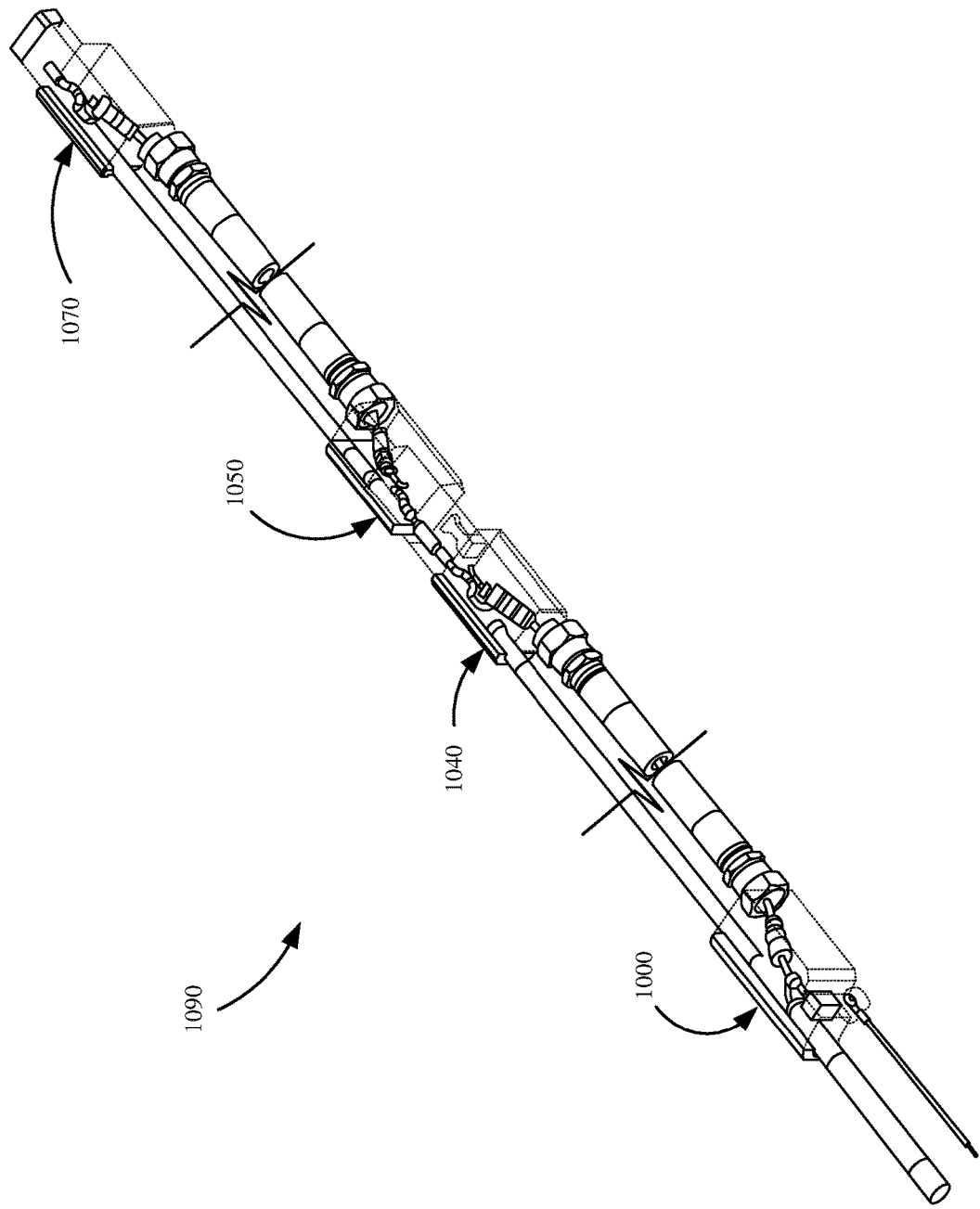

FIG. 10D illustrates a full view of a modular fluid delivery assembly for a single fluid component 1090 comprising, for example, inlet component 1000, internal components 1040 and 1050, and outlet component 1070.

Fluid transport modules have been described herein with regard to different features which are described as examples only, and not intended to limit the scope of the present invention. For example, modules have been described with fluid hosing comprising 100 feet in length. However, it is to be understood that different modules of different sizes may be useful for other embodiments. For example, a single fluid transport module may comprise fluid tubing comprising 10 feet, 25 feet, 50 feet, 100 feet, or any other desired length that may be useful by a user. Additionally, a user may be able to purchase different modules of differing lengths in order to achieve the desired fluid delivery system length for a specific application.

Although the present invention has been described with reference to preferred embodiments, workers skilled in the art will recognize that changes may be made in form and detail without departing from the spirit and scope of the invention.

What is claimed is:
1. A fluid delivery system comprising:
a first internally heated hose assembly comprising:
a first flexible hose having a first inlet end and a first outlet end;
a first connection assembly coupled to the first outlet end of the first flexible hose, the first flexible hose and the first connection assembly forming a first fluid channel, wherein the first connection assembly comprises:
a first hydraulic connection; and
a first heating element passageway that intersects the first fluid channel and includes a seal; and
a first internal heating element comprising one or more electrical conductors, wherein the first internal heating element is at least partially disposed in the first fluid channel and the first heating element passageway, and is configured to heat the first fluid channel; and
a second internally heated hose assembly comprising:
a second flexible hose having a second inlet end and a second outlet end;
a second connection assembly coupled to the second inlet end of the second flexible hose, the second flexible hose and the second connection assembly forming a second fluid channel, wherein the second connection assembly comprises:
a second hydraulic connection removably couplable to the first connection assembly such that the first and second internally heated hose assemblies are hydraulically coupled in series; and
a second internal heating element comprising one or more electrical conductors, wherein the second inter- nal heating element is at least partially disposed in the second fluid channel and configured to heat the second fluid channel wherein the fluid delivery system comprises a plural component system having a dispenser configured to dispense first and second fluid components, and the first and second flexible hoses are connected in series to form a first multi-segment hose assembly configured to deliver the first fluid component to the dispenser, and further comprising:

a second multi-segment hose assembly configured to deliver the second fluid component to the dispenser, the second multi-segment hose assembly having one or more electrical heating elements configured to heat the second multi-segment hose assembly; and at least one controller component configured to control temperatures of the first and second multi-segment hose assemblies.

2. The fluid delivery system of claim 1, wherein the at least one controller is configured to generate at least one control signal to control a temperature of the first internal heating element and the second internal heating element.

3. The fluid delivery system of claim 2, wherein the at least one controller comprises a single controller configured to control the temperature of both the first and second internal heating elements.

4. The fluid delivery system of claim 2, wherein the second outlet end of the second flexible hose is coupled to the dispenser configured to dispense the fluid onto a surface.

5. The fluid delivery system of claim 1, wherein the first connection assembly further comprises:

an electrical chamber having an electrical connection;
a fluid chamber having the first hydraulic connection; and
wherein the electrical chamber receives the first internal heating element such that the electrical connection is separated from the first hydraulic connection.

6. The fluid delivery system of claim 1, wherein the first and second internal heating elements are electrically connected in series.

7. The fluid delivery system of claim 1, wherein the first inlet end of the first flexible hose is configured to receive pressurized fluid from a fluid pump,
the first fluid channel is configured to convey the pressurized fluid to the first outlet end, and
the second coupling portion of the second internally heated hose assembly is configured to receive the pressurized fluid from the first outlet end.

8. The fluid delivery system of claim 1, wherein the first internally heated hose assembly comprises:

an inlet connection assembly that is coupled to the first inlet end of the first flexible hose and includes an inlet heating element passageway that intersects the first fluid channel, wherein the first internal heating element is at least partially disposed in the inlet heating element passageway.

9. The fluid delivery system of claim 1, and further comprising a first electrical return line to the first electrical heating element, the first electrical return line located outside of the first fluid channel.

10. The fluid delivery system of claim 1, wherein the second connection assembly further comprises:

a second heating element passageway that intersects the second fluid channel and includes a seal, wherein the second internal heating element is at least partially disposed in the second heating element passageway.

11. A fluid application system comprising:

a pump configured to pump fluid from a fluid source;
a fluid dispenser configured to dispense the fluid on to an application surface;
a multi-segment heated hose assembly configured to convey the pumped fluid to the fluid dispenser, the multi-segment heated hose assembly comprising:
a first hose segment having:
a first electrical heating element comprising one or more electrical conductors, the first electrical heating element disposed within a bore of the first hose segment that forms a first portion of a first fluid channel, the first electrical heating element configured to provide a first heat source within the first hose segment; and
a first connection assembly coupled to an outlet end of the first hose segment, the first connection assembly comprising:
a first electrical connection electrically coupled to the first electrical heating element;
a first hydraulic connection that forms a second portion of the first fluid channel; and
a first electrical heating element passageway that intersects the first fluid channel and includes a first seal; and
wherein the first electrical heating element is disposed in the first electrical heating element passageway; and
a second hose segment having:
a second electrical heating element disposed within a bore of the second hose segment that forms a first portion of a second fluid channel, the second electrical heating element configured to provide a second heat source within the second hose segment; and
a second connection assembly coupled to an inlet end of the second hose segment, the second connection assembly comprising:
a second electrical connection electrically coupled to the second electrical heating element;
a second hydraulic connection that forms a second portion of the second fluid channel, the second hydraulic connection configured to hydraulically couple the second hose segment to the first connection assembly such that the first and second hose segments are hydraulically coupled in series; and
a second electrical heating element passageway that intersects the second fluid channel and includes a second seal; and
wherein the second electrical heating element is disposed in the second electrical heating element passageway; and
at least one controller component configured to control temperatures of the first and second heat sources provided by the first and second electrical heating elements.

12. The fluid application system of claim 11, wherein the fluid application system comprises a plural component system configured to dispense first and second fluid components,
the multi-segment hose assembly comprises a first multi-segment hose assembly configured to deliver the first fluid component to the dispenser,
the first and second electrical heating element are electrically connected in series, and further comprising:

a second multi-segment hose assembly configured to deliver the second fluid component to the dispenser, wherein the first and second multi-segment hose assemblies are electrically connected in parallel.

13. The fluid application system of claim 11, wherein the first seal is configured to fit around the first electrical heating element and the second seal is configured to fit around the second electrical heating element.

14. The fluid delivery system of claim 11, wherein the first seal contacts a surface of the first electrical heating element and the second seal contacts a surface of the second electrical heating element.

* * * * *